(12) United States Patent
Hanna

(10) Patent No.: US 11,672,341 B2
(45) Date of Patent: Jun. 13, 2023

(54) COLLAPSIBLE UNIT FOR FACILITATING MULTIUSE OF THE COLLAPSIBLE UNIT

(71) Applicant: Seth Hanna, Columbia, SC (US)

(72) Inventor: Seth Hanna, Columbia, SC (US)

( * ) Notice: Subject to any disclaimer, the term of this patent is extended or adjusted under 35 U.S.C. 154(b) by 348 days.

(21) Appl. No.: 17/068,622

(22) Filed: Oct. 12, 2020

(65) Prior Publication Data

US 2022/0110451 A1   Apr. 14, 2022

(51) Int. Cl.
| | |
|---|---|
| *A47C 1/035* | (2006.01) |
| *B60B 33/00* | (2006.01) |
| *B60B 33/06* | (2006.01) |
| *A47C 4/04* | (2006.01) |
| *A47B 5/04* | (2006.01) |
| *A47C 7/50* | (2006.01) |
| *G05B 19/042* | (2006.01) |
| *E04B 1/343* | (2006.01) |
| *E04H 1/12* | (2006.01) |
| *E04B 2/74* | (2006.01) |

(52) U.S. Cl.
CPC ............... *A47C 1/035* (2013.01); *A47B 5/04* (2013.01); *A47C 4/04* (2013.01); *A47C 7/5066* (2018.08); *B60B 33/0002* (2013.01); *B60B 33/06* (2013.01); *E04B 1/34357* (2013.01); *E04H 1/12* (2013.01); *G05B 19/042* (2013.01); *E04B 2002/7483* (2013.01); *G05B 2219/25025* (2013.01)

(58) Field of Classification Search
CPC .. A47B 5/04; A47C 1/035; A47C 4/04; A47C 7/5066; B60B 33/0002; B60B 33/06; E04B 1/34357; E04B 2002/7483; E04H 1/12; E04H 1/125; G05B 19/042; G05B 2219/25025; G05B 2219/2613
See application file for complete search history.

(56) References Cited

U.S. PATENT DOCUMENTS

| | | | | | |
|---|---|---|---|---|---|
| 664,282 | A | * | 12/1900 | Merker | A61H 33/06 4/526 |
| 1,008,574 | A | * | 11/1911 | Weinstock | A47F 3/005 312/258 |
| 1,342,269 | A | * | 6/1920 | Stewart | A47B 43/02 312/258 |

(Continued)

FOREIGN PATENT DOCUMENTS

| | | | | |
|---|---|---|---|---|
| CN | 110700637 A | * | 1/2020 | |
| WO | WO-2017181133 A1 | * | 10/2017 | ......... E04B 1/34357 |
| WO | WO-2018038698 A1 | * | 3/2018 | ............. A47K 11/02 |

*Primary Examiner* — James M Ference

(57) ABSTRACT

Disclosed herein is a collapsible unit for facilitating multiuse of the collapsible unit, in accordance with some embodiments. Accordingly, the collapsible unit may be deployable on at least one surface. Further, the collapsible unit may include a frame. Further, the frame may include a plurality of primary members disposed vertically in relation to the at least one surface. Further, the frame may include at least one secondary member coupled with the plurality of primary members. Further, the collapsible unit may include a seat member disposed in the frame. Further, the seat member may include a seat panel disposed in the enclosure. Further, the collapsible unit may include at least one wheel coupled to the frame. Further, the at least one wheel may be configured for moving the collapsible unit on the at least one surface.

17 Claims, 36 Drawing Sheets

(56) References Cited

U.S. PATENT DOCUMENTS

| | | | | |
|---|---|---|---|---|
| 3,018,857 A * | 1/1962 | Parham | E04H 15/001 | 52/36.2 |
| 3,034,523 A * | 5/1962 | De Shano | E04H 15/48 | 135/900 |
| 3,233,935 A * | 2/1966 | Brindle | B60P 3/34 | 296/168 |
| 3,351,956 A * | 11/1967 | Thoner | A61H 33/06 | 392/326 |
| 3,351,957 A * | 11/1967 | Ikeda | A61H 33/06 | 4/526 |
| 3,581,315 A * | 6/1971 | Milliner | A61H 33/10 | 4/534 |
| 3,629,982 A * | 12/1971 | Ballay | E04B 1/3444 | 52/79.5 |
| 3,648,299 A * | 3/1972 | Durst | A61H 33/06 | 392/394 |
| 3,799,608 A * | 3/1974 | Smutny | E04H 1/1205 | 135/117 |
| 3,923,134 A * | 12/1975 | Rezazadeh | G07F 9/002 | 381/167 |
| 3,984,949 A * | 10/1976 | Wahlquist | E04B 1/3445 | 52/143 |
| 4,031,573 A * | 6/1977 | Romanoff | A61H 33/06 | 607/83 |
| 4,987,706 A * | 1/1991 | Hughes | E04B 1/8218 | 52/79.5 |
| 5,033,493 A * | 7/1991 | Senchuck | E04H 1/12 | 135/901 |
| 5,096,214 A * | 3/1992 | Walker | E04H 1/12 | D34/24 |
| 5,511,254 A * | 4/1996 | O'Brien | A61H 33/06 | 4/526 |
| 5,533,305 A * | 7/1996 | Bielecki | E04H 1/1277 | 55/482 |
| 5,622,198 A * | 4/1997 | Elsinger | E04H 15/48 | 135/128 |
| 5,628,522 A * | 5/1997 | Hall | B60B 33/06 | 280/46 |
| 5,743,050 A * | 4/1998 | Shibata | A63B 71/0036 | 52/27 |
| 5,775,034 A * | 7/1998 | Logue | A47B 21/06 | 108/37 |
| 6,354,044 B1 * | 3/2002 | Lagace, Jr. | A47C 15/004 | 52/79.5 |
| 7,427,101 B1 * | 9/2008 | Zernov | A47C 7/666 | 297/16.2 |
| 8,640,391 B2 * | 2/2014 | Newkirk | E04F 19/08 | 52/220.1 |
| 9,022,414 B2 * | 5/2015 | Bell | A47F 11/02 | 280/30 |
| 9,795,222 B2 * | 10/2017 | Piispanen | A47C 7/626 | |
| 9,795,526 B2 * | 10/2017 | Davis | A61G 5/10 | |
| 9,801,783 B2 * | 10/2017 | Perovic | A61H 33/066 | |
| 10,183,608 B2 * | 1/2019 | Knight | B60P 3/341 | |
| 10,985,689 B2 * | 4/2021 | Wickramasekera | E04B 1/34336 | |
| 2007/0169258 A1 * | 7/2007 | Hoge | A61H 33/06 | 4/527 |
| 2009/0039685 A1 * | 2/2009 | Zernov | A47C 4/286 | 297/16.2 |
| 2009/0179463 A1 * | 7/2009 | Fargason, III | A01K 97/01 | 297/16.2 |
| 2011/0219706 A1 * | 9/2011 | Bates | E03C 1/181 | 52/27 |
| 2011/0283632 A1 * | 11/2011 | Sutton | A47B 96/20 | 52/36.1 |
| 2011/0290291 A1 * | 12/2011 | Neal | E04H 1/1244 | 135/144 |
| 2014/0252817 A1 * | 9/2014 | Lovley, II | A47C 7/66 | 297/184.15 |
| 2014/0300087 A1 * | 10/2014 | Bell | E04H 1/1222 | 280/651 |
| 2014/0345041 A1 * | 11/2014 | Barghelame | A61H 33/066 | 4/526 |
| 2016/0051441 A1 * | 2/2016 | Perovic | A61H 33/066 | 4/526 |
| 2017/0335561 A1 * | 11/2017 | Wickramasekera | H02S 20/30 | |
| 2020/0347626 A1 * | 11/2020 | Petty | E04B 1/34357 | |
| 2022/0110451 A1 * | 4/2022 | Hanna | E04B 1/34357 | |

* cited by examiner

COLLAPSIBLE UNIT FOR FACILITATING MULTIUSE OF THE COLLAPSIBLE UNIT

FIELD OF THE INVENTION

Generally, the present disclosure relates to the field of chairs and seats. More specifically, the present disclosure relates to a collapsible unit for facilitating multiuse of the collapsible unit.

BACKGROUND OF THE INVENTION

Existing techniques for facilitating multiuse of the collapsible unit are deficient with regard to several aspects. For instance, current technologies do not provide a user with privacy. Further, current technologies do not provide allow the user to transport the collapsible unit based on automation. Furthermore, current technologies do not provide the user with an inflatable seat cushion. Moreover, current technologies do not allow the user to convert the collapsible unit into a flat structure.

Therefore, there is a need for an improved collapsible unit for facilitating multiuse of the collapsible unit that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a collapsible unit for facilitating multiuse of the collapsible unit, in accordance with some embodiments. Accordingly, the collapsible unit may be deployable on at least one surface. Further, the collapsible unit may include a frame. Further, the frame may include a plurality of primary members disposed vertically in relation to the at least one surface. Further, the frame may include at least one secondary member coupled with the plurality of primary members. Further, a first end of a secondary member of the at least one secondary member may be coupled to a first primary member of the plurality of primary members and a second end of the secondary member may be coupled to a second primary member of the plurality of primary members. Further, the at least one secondary member may be configured for retractably extending between a plurality of positions for movably positioning the plurality of primary members. Further, the movably positioning of the plurality of primary members transitions the frame between at least one extended state and a collapsed state. Further, the plurality of primary members and the at least one secondary member forms an enclosure and at least one opening leading into the enclosure in the at least one extended state. Further, the plurality of primary members does not form the enclosure in the collapsed state. Further, the collapsible unit may include a seat member disposed in the frame. Further, the seat member may be transitionable between at least one seat extended state and a seat collapsed state based on transitioning of the frame between the at least one extended state and the collapsed state. Further, the seat member may include a seat panel disposed in the enclosure. Further, the seat panel may be substantially perpendicular to the plurality of primary members in the at least one seat extended state. Further, the seat panel may be substantially parallel to the plurality of primary members in the seat collapsed state. Further, the collapsible unit may include at least one wheel coupled to the frame. Further, the at least one wheel may be configured for moving the collapsible unit on the at least one surface. Further, the movably positioning of the plurality of primary members may be based on the moving of the at least one wheel.

Further disclosed herein is a collapsible unit for facilitating multiuse of the collapsible unit, in accordance with some embodiments. Accordingly, the collapsible unit may be deployable on at least one surface. Further, the collapsible unit may include a frame. Further, the frame may include a plurality of primary members disposed vertically in relation to the at least one surface. Further, the frame may include at least one secondary member coupled with the plurality of primary members. Further, a first end of a secondary member of the at least one secondary member may be coupled to a first primary member of the plurality of primary members and a second end of the secondary member may be coupled to a second primary member of the plurality of primary members. Further, the plurality of primary members movably positionable to a plurality of positions for transitioning the at least one secondary member between at least one member extended state and a folded state. Further, the transitioning of the at least one secondary member transitions the frame between at least one extended state and a collapsed state. Further, the plurality of primary members and the at least one secondary member forms an enclosure and at least one opening leading into the enclosure in the at least one extended state. Further, the plurality of primary members does not form the enclosure in the collapsed state. Further, the collapsible unit may include a seat member disposed in the frame. Further, the seat member may be transitionable between at least one seat extended state and a seat collapsed state based on transitioning of the frame between the at least one extended state and the collapsed state. Further, the seat member may include a seat panel disposed in the enclosure. Further, the seat panel may be substantially perpendicular to the plurality of primary members in the at least one seat extended state. Further, the seat panel may be substantially parallel to the plurality of primary members in the seat collapsed state. Further, the collapsible unit may include at least one wheel coupled to the frame. Further, the at least one wheel may be configured for moving the collapsible unit on the at least one surface. Further, the at least one wheel may be configured for positioning the plurality of primary members to the based on the moving of the at least one wheel.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
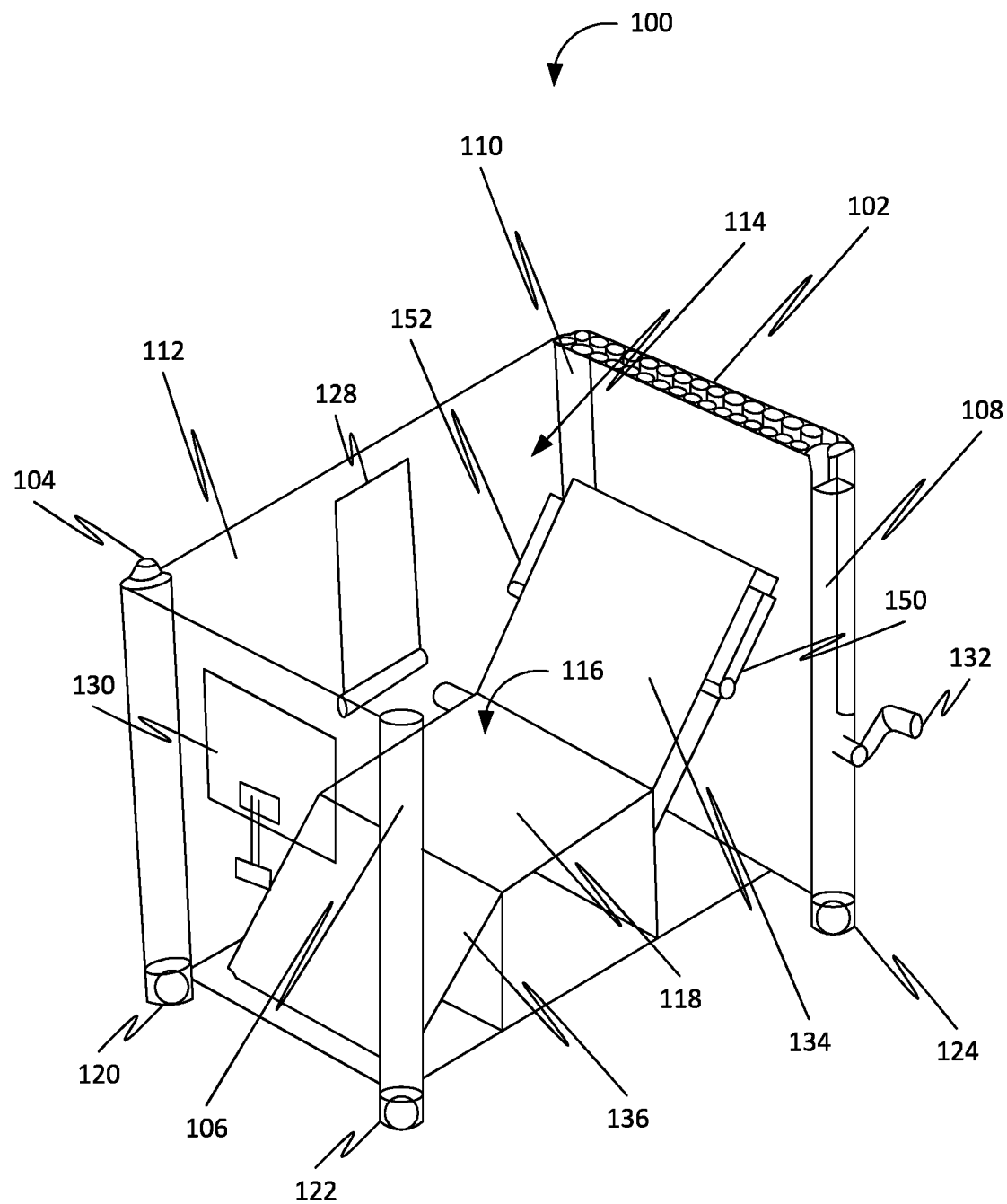
FIG. 1 is a top right side perspective view of a collapsible unit for facilitating multiuse of the collapsible unit, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of collapsible unit for facilitating multiuse of the collapsible unit, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer, etc.) and/or possession of a machine readable secret data (e.g. encryption key, decryption key, bar codes, etc.) and/or or possession of one or more embodied characteristics unique to the user (e.g. biometric variables such as but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes a collapsible unit for facilitating the multiuse of the collapsible unit. Further, the collapsible unit may include a cubicle that may have both manual and automatic capabilities. The disclosed collapsible unit may include a reclining seat, external monitor, handle crank, proximity sensor, relay communicator (or communication device), drop-down desk, retractable wheels, storage space, and a retractable privacy roller curtain (or roller curtain).

In the present society, specifically on a college campus, there are designated areas for various daily needs. Contained within some of these areas are study cubicles or furniture that students can use if they need. These structures come in all shapes and sizes with various intended functions. When utilizing these cubicles, the user most times is desiring privacy, convenience, and versatility. However, the various cubicles fall short, in some, if not all these categories. Some don't provide a completely private experience, while others don't provide the convenience to be used in multiple ways without taking up useable space when not in use. To resolve this issue there exist various types of cubicles within various spaces that can meet these needs. However, it costs the user time when they are required to migrate between areas. An objective of the disclosed collapsible unit is to provide users with an apparatus that is a multiuse space. The disclosed collapsible unit intends to provide the user with options of complete, partial or removed privacy. The disclosed collapsible unit intends to allow the user to connect multiple cubicles together with the same variable privacy options. Further, the disclosed collapsible unit intends to provide the user with a personal inflatable seat cushion. The disclosed collapsible unit intends to provide the user with the ability to convert the sitting area into a bed-like structure for resting purposes. The disclosed collapsible unit intends to allow the user to collapse the structure when not in use to save space. The disclosed collapsible unit intends to provide a structure that allows the user to roll the whole apparatus around for easy manual transportation. The disclosed collapsible unit intends to provide the user with the option of setting a location within an external device so that the cubicle can move on its own to the designated spot through automation. The disclosed collapsible unit intends to optimize the study space of the user by supplying the external monitor along with desk space. The disclosed collapsible unit intends to provide the user with the storage space underneath the seat during use. The disclosed collapsible unit intends to provide the user with an easy way to exit and enter.

Further, the reclining seat (or chair) may be of any shape, size, material, features, type or kind, orientation, location, quantity, components, and arrangement of components that would allow the collapsible unit to fulfill the objectives and intents. Further, the reclining seat may be contained within the boundaries of the collapsible unit. Further, the reclining seat may be able to lay completely flat or upright. Further, the reclining seat may include two armrests.

Further, the collapsible unit may include a retracting method. The retracting method can be of any shape, size, material, features, type or kind, orientation, location, quantity, components, and arrangement of components that would allow the collapsible unit to fulfill the objectives and intents of the collapsible unit.

Further, the collapsible unit may include the handle crank or button that will collapse or extend the cubicle manually or automatically, respectively.

Further, the collapsible unit may include the roller curtain for the user's privacy. The roller curtain may be of any shape, size, material, features, type or kind, orientation, location, quantity, components, and arrangement of components that would allow the collapsible unit to fulfill the objectives and intents of the collapsible unit. However, the roller curtain may remain aligned in one layer but may allow for the user to pass through it and afterward reset to the aligned layer. Further, a far end of a connector beam may be the part to connect to a single cubicle or to other cubicles. Further, the roller curtain may be retracted or extended based on user preference. Further, the roller curtain may be concealed in its entirety within a section of the collapsible unit.

Further, the collapsible unit may include a tube with a vacuum seal cushion (or cushion). The tube and the cushion may be of any shape, size, material, features, type or kind, orientation, location, quantity, components, and arrangement of components that may allow the collapsible unit to fulfill the objectives and intents of the collapsible unit. Further, the tube may be contained within the boundaries of the collapsible unit. Further, once the cushion has been deflated that the cushion may be able to be stored optimally. Further, a size of the cushion may be the same size as the chair which is the size that may satisfy the needs of the user. Further, the tube may have the ability to deflate and inflate the cushion. Further, the cushion may include a connection tube that is connected to the tube for an airtight seal.

Further, the collapsible unit may be associated with a collapsed mobile form (or collapsed form) and an extended stationary form. Both the collapsed mobile form and the extended stationary form may be of any shape, size, material, features, type or kind, orientation, location, quantity, components, and arrangement of components that would allow the collapsible unit to fulfill the objectives and intents of the collapsible unit. Further, once a body of the collapsible unit is extended, the wheels of the collapsible unit may be extended. Further, in the collapsed form, the wheels of the collapsible unit may be retracted.

Further, the collapsible unit may include the retractable wheels (or wheels). Further, the wheel may be of any shape, size, material, features, type or kind, orientation, location, quantity, components, and arrangement of components that would allow the collapsible unit to fulfill the objectives and intents of the collapsible unit. Further, the wheels may either all be retracted, or all be extended together. Further, when extended or retracting, the collapsible unit may include a method so that the wheels would be in the same state and transition between the extended state and the retracted state in unison.

Further, the collapsible unit may include the drop-down desk (or desk). Further, the desk may be of any shape, size, material, features, type or kind, orientation, location, quantity, components, and arrangement of components that would allow the collapsible unit to fulfill the objectives and intents of the collapsible unit. Further, the desk may be contained within the boundaries of the collapsible unit. Further, the desk may be able to relocate within the boundaries of the collapsible unit.

Further, the collapsible unit may include an external pivoting monitor (or monitor). Further, the monitor may be of any shape, size, material, features, type or kind, orientation, location, quantity, components, and arrangement of components that would allow the collapsible unit to fulfill the objectives and intents of the collapsible unit. Further, the monitor may be contained within the boundaries of the collapsible unit. Further, the monitor may have free-range motion. Further, the monitor may have connectivity between multiple platforms.

Further, the tube may be of any shape, size, material, features, type or kind, orientation, location, quantity, components, and arrangement of components that would allow the collapsible unit to fulfill the objectives and intents of the collapsible unit. Further, the tube may be contained within the boundaries of the collapsible unit. Further, the tube may be able to extend. Further, the tube may be able to give and receive airflow from an external air pumping mechanism.

Further, the collapsible unit may include a communication device. Further, the communication device may be of any shape, size, material, features, type or kind, orientation, location, quantity, components, and arrangement of components that would allow the collapsible unit to fulfill the objectives and intents of the collapsible unit. Further, the communication device may be able to manage the autonomous positioning, spatial awareness, and communication with other units. Further, the communication device may receive commands from an external device or an internal source. Further, to communicate within a given environment, the collapsible unit may use nodes. Further, a minimum of three nodes may be required to create space for communication and positioning.

Further, the collapsible unit may include a sensor that can detect and communicate with other similar structures for automatic positioning, or storage once collapsed. Further, the collapsible unit may include a retractable wall that can enclose one unit alone or connect to other units.

Figure 14:
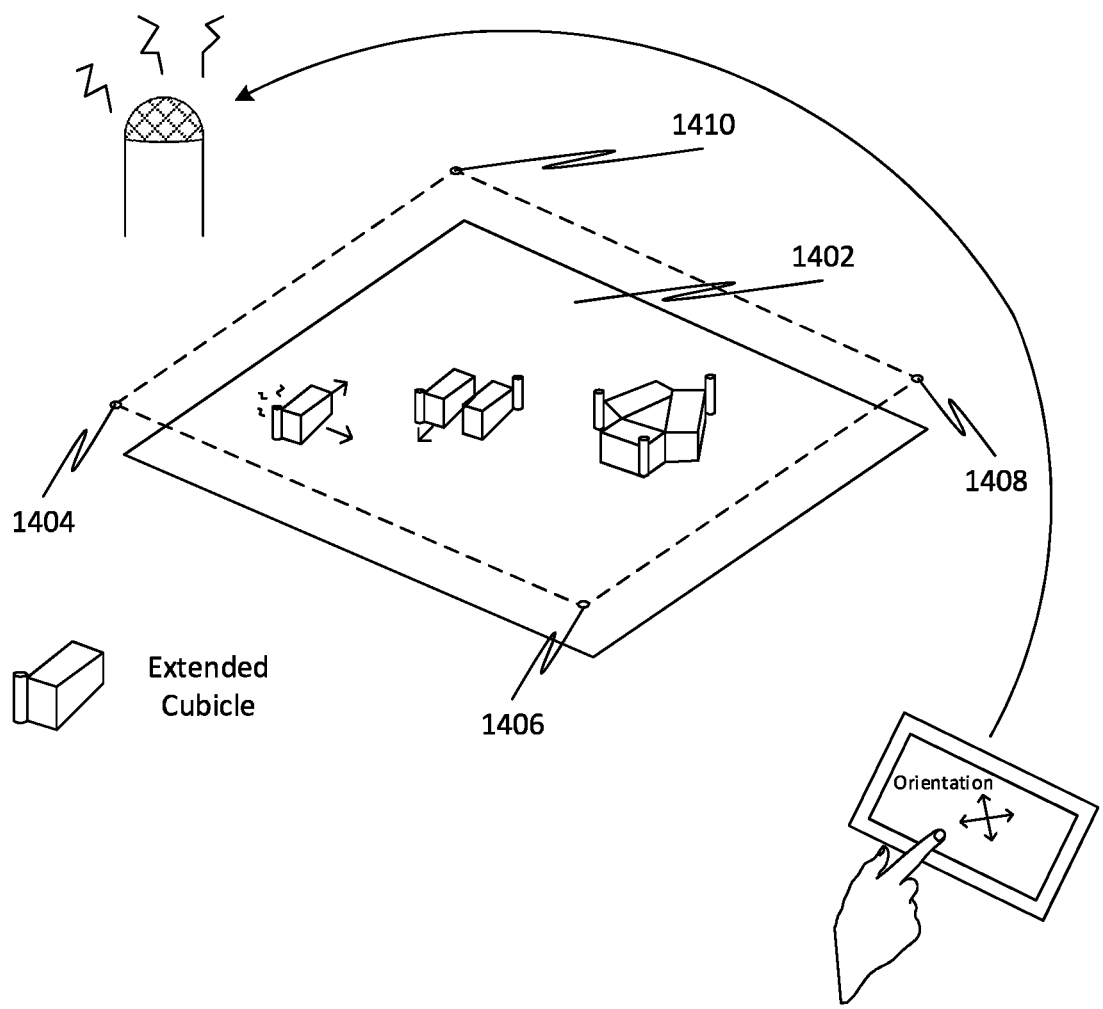
FIG. 14 is a schematic of a communication network associated with the collapsible unit, in accordance with some embodiments.

FIG. 1 is a top right side perspective view of a collapsible unit 100 for facilitating multiuse of the collapsible unit 100, in accordance with some embodiments. Accordingly, the collapsible unit 100 may be deployable on at least one surface 1402 (as shown in FIG. 14). Further, the collapsible unit 100 may include a frame 102. Further, the frame 102 may include a plurality of primary members 104-110 disposed vertically in relation to the at least one surface 1402. Further, the frame 102 may include at least one secondary member 112 coupled with the plurality of primary members 104-110. Further, a first end of a secondary member of the at least one secondary member 112 may be coupled to a first primary member of the plurality of primary members 104-110 and a second end of the secondary member may be coupled to a second primary member of the plurality of primary members 104-110. Further, the at least one secondary member 112 may be configured for retractably extending between a plurality of positions for movably positioning the plurality of primary members 104-110. Further, the movably positioning of the plurality of primary members 104-110 transitions the frame 102 between at least one extended state and a collapsed state. Further, the plurality of primary members 104-110 and the at least one secondary member 112 forms an enclosure 114 and at least one opening leading into the enclosure 114 in the at least one extended state. Further, the plurality of primary members 104-110 does not form the enclosure 114 in the collapsed state.

Further, the collapsible unit 100 may include a seat member 116 disposed in the frame 102. Further, the seat member 116 may be transitionable between at least one seat extended state and a seat collapsed state based on transitioning of the frame 102 between the at least one extended state and the collapsed state. Further, the seat member 116 may include a seat panel 118 disposed in the enclosure 114. Further, the seat panel 118 may be substantially perpendicular to the plurality of primary members 104-110 in the at least one seat extended state. Further, the seat panel 118 may be substantially parallel to the plurality of primary members 104-110 in the seat collapsed state.

Further, the collapsible unit 100 may include at least one wheel 120-124 coupled to the frame 102. Further, the at least one wheel 120-124 may be configured for moving the collapsible unit 100 on the at least one surface 1402. Further, the movably positioning of the plurality of primary members 104-110 may be based on the moving of the at least one wheel 120-124.

In further embodiments, the collapsible unit 100 may include at least one curtain coupled with the frame 102 using at least one curtain coupling mechanism. Further, the at least one curtain may include at least one curtain panel retractably extended between the first primary member and the second primary member for covering the at least one opening of the frame 102. Further, the covering of the at least one opening conceals the enclosure 114. Further, the covering of the enclosure 114 provides privacy to an individual.

Further, in some embodiments, the at least one curtain panel may be transitionable between an open state and a closed state. Further, the at least one curtain panel allows access to the enclosure 114 through the at least one opening in the open state. Further, the at least one curtain panel restricts access to the enclosure 114 through the at least one opening in the closed state.

Figure 2:
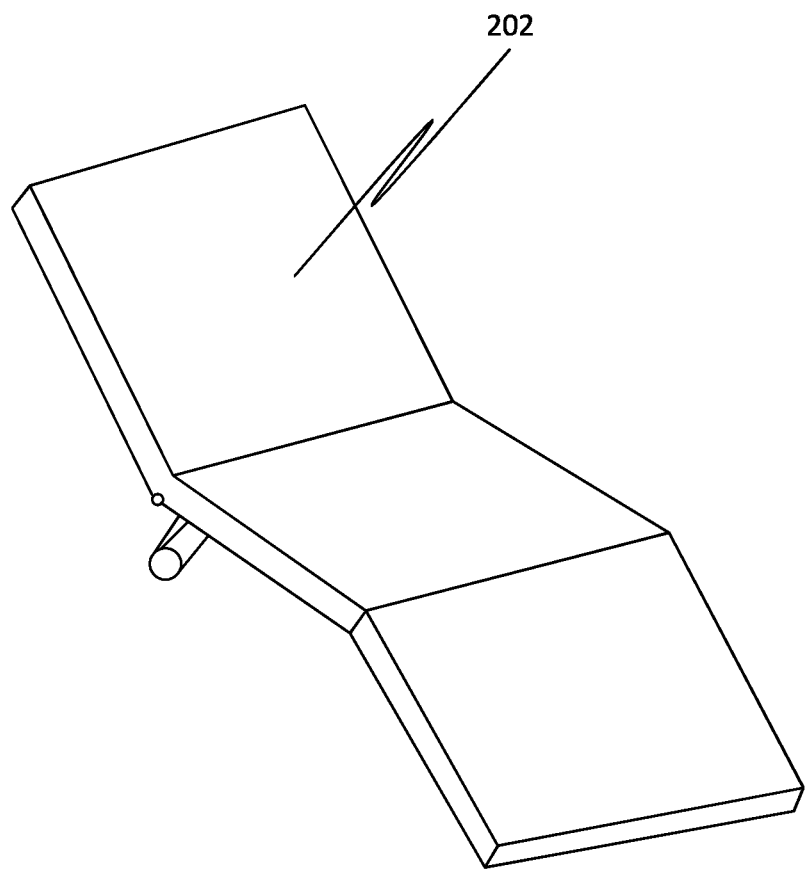
FIG. 2 is a top left side perspective view of the cushion in an inflated state, in accordance with some embodiments.

In further embodiments, the collapsible unit 100 may include a cushion 202 (as shown in FIG. 2) coupled with the seat member 116. Further, the cushion 202 may include a top panel and a bottom panel. Further, a periphery of the top panel may be attached to a periphery of the bottom panel for forming an interior space and an opening leading into the interior space. Further, the cushion 202 may be inflatably deflatable based on receivably removing of at least one fluid from the interior space through the opening. Further, the at least one fluid may include at least one gas, at least one liquid, etc. Further, the at least one gas may include air.

Further, in some embodiments, a wheel of the at least one wheel 120-124 may be configured for retractably extending from a base end of a primary member of the plurality of primary members 104-110. Further, the wheel 120 may be configured for transitioning between a wheel retracted state and a wheel extended state based on the retractably extending of the wheel 120. Further, the wheel 120 protrudes from the base end in the wheel extended state. Further, the wheel 120 does not protrude from the base end in the wheel retracted state. Further, the wheel 120 moves the collapsible unit 100 in the wheel extended state. Further, the wheel 120 does not move the collapsible unit 100 in the wheel retracted state.

In further embodiments, the collapsible unit 100 may include a drop-down desk 128 coupled to the frame 102. Further, the drop-down desk 128 may include at least one desk panel. Further, a first end of the at least one desk panel may be rotatably attached to the frame 102. Further, the drop-down desk 128 may be transitionable between a desk closed state and at least one desk open state. Further, the at least one desk panel may be disposed in the enclosure 114. Further, the at least one desk panel may be substantially perpendicular to at least one primary member of the plurality of primary members 104-110 in the at least one desk open state. Further, the at least one desk panel may be substantially parallel to the at least one primary member in the desk closed state. Further, the drop down desk 128 may be configured for relocation within a boundary of the collapsible unit 100.

In further embodiments, the collapsible unit 100 may include at least one interface device 130 pivotally coupled to the frame 102 using at least one coupling mechanism. Further, the at least one interface device 130 may be movable in a plurality of device positions. Further, the at least one interface device 130 may be orientable in at least one orientation. Further, the at least one interface device 130 may include at least one display device, at least one input device, at least one presentation device, etc. Further, the at least one interface device 130 may include a Light Emitting Device screen, Liquid Crystal Display, etc.

In further embodiments, the collapsible unit 100 may include a handle crank assembly 132 operationally coupled with the frame 102. Further, the handle crank assembly 132 may be configured for receiving at least one external force. Further, the handle crank assembly 132 may be configured for transitioning the frame 102 between the at least one extended state and the collapsed state based on the receiving of the at least one external force.

Further, in some embodiments, the seat member 116 may include a backrest panel 134 and a footrest panel 136. Further, the first primary member opposes the second primary member. Further, a first end of the footrest panel 136 may be pivotally coupled to a base end of the first primary member and a second end of the footrest panel 136 may be pivotally coupled to a first end of the seat panel 118 and a second end of the seat panel 118 may be pivotally coupled with a first end of the backrest panel 134 and a second end of the backrest panel 134 may be pivotally coupled with a top end of the second primary member. Further, the footrest panel 136 and the backrest panel 134 may be substantially perpendicular to the seat panel 118 in the at least one seat extended state. Further, the footrest panel 136 and the backrest panel 134 may be substantially parallel to the seat panel 118 in the seat collapsed state.

Further, in some embodiments, the secondary member may include a telescopic member. Further, the telescopic member may include a main member and a plurality of extendable members disposed in the main member. Further, the first end of the secondary member may include a first end of the main member. Further, the second end of the secondary member may include a second end of a first extendable member of the plurality of extendable members. Further, the telescopic member may be configured for retractably extending the plurality of extendable members between the plurality of positions.

Figure 29:
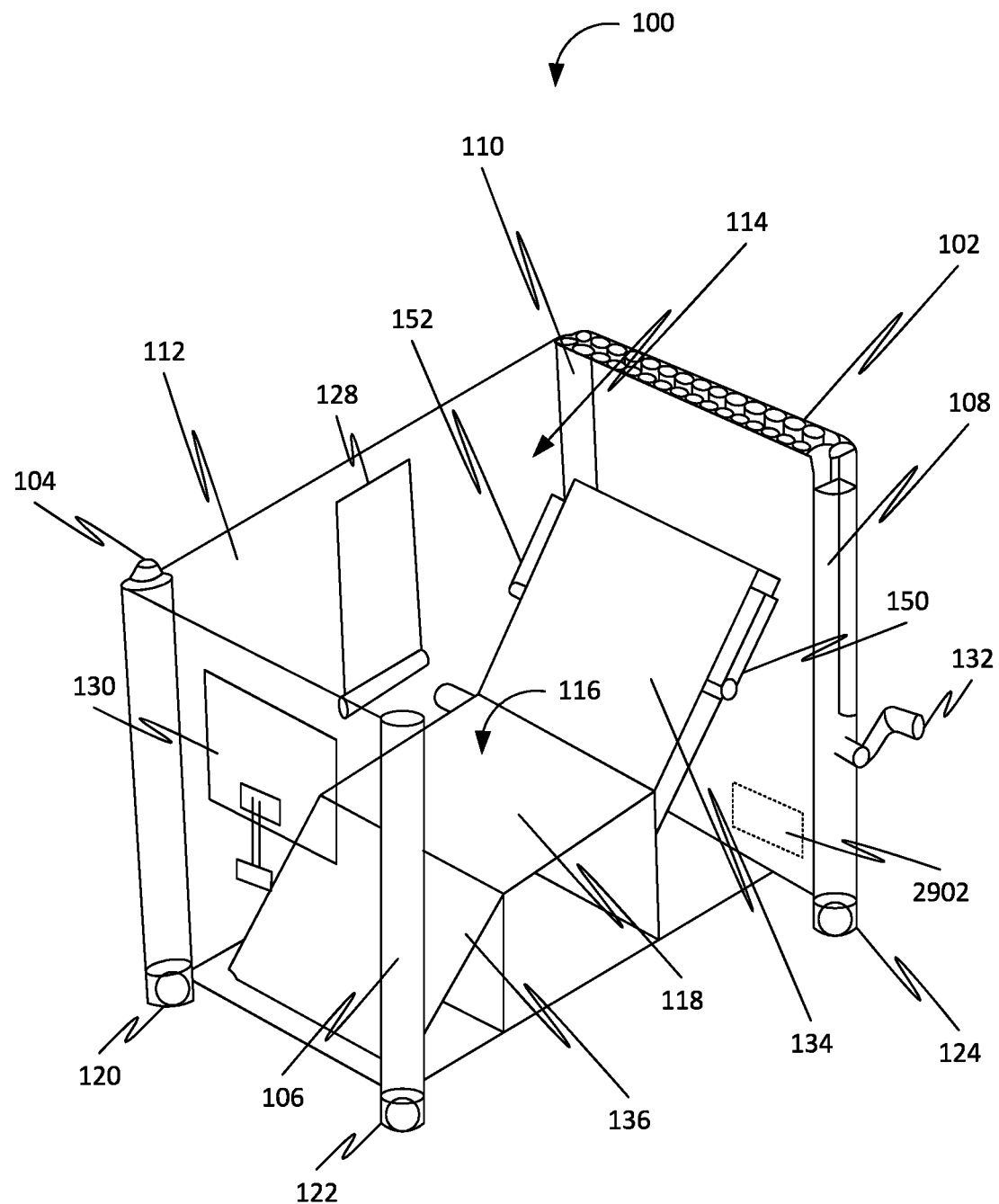
FIG. 29 is a top right side perspective view of the collapsible unit for facilitating multiuse of the collapsible unit, in accordance with some embodiments.

In further embodiments, the collapsible unit 100 may include at least one first actuator 2902 (as shown in FIG. 29) operationally coupled with the frame 102. Further, the at least one first actuator 2902 may be configured for transitioning the frame 102 between the at least one extended state and the closed state based on an input command. Further, the collapsible unit 100 may include at least one input device communicatively coupled with the at least one first actuator 2902. Further, the at least one input device may be configured for generating the input command based on at least one action receivable by the at least one input device. Further, the at least one input device may be disposed on the frame 102. Further, the at least one input device may include at least one pushable button. Further, the at least one pushable button may be configured for receiving at least one push action. Further, the at least one input device may include a computing device such as a smartphone, a tablet, a smartwatch, a laptop, a desktop, and so on.

Figure 30:
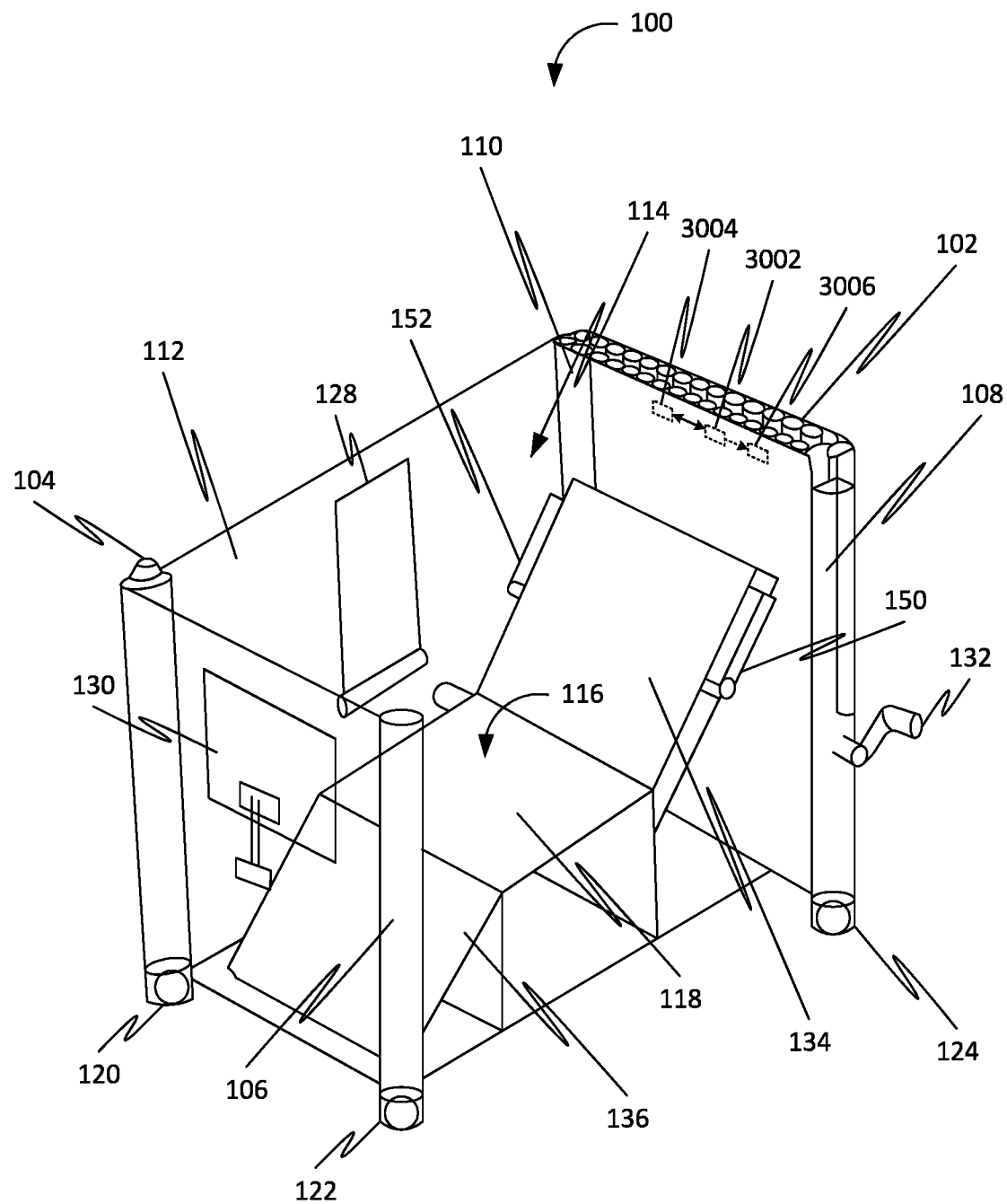
FIG. 30 is a top right side perspective view of the collapsible unit for facilitating multiuse of the collapsible unit, in accordance with some embodiments.

In further embodiments, the collapsible unit 100 may include a communication device 3002 (as shown in FIG. 30) disposed on the frame 102. Further, the communication device 3002 may be configured for receiving at least one first input data from at least one user device. Further, the at least one user device may include a computing device such as a smartphone, a tablet, a smartwatch, a laptop, a desktop, and so on. Further, the collapsible unit 100 may include a processing device 3004 (as shown in FIG. 30) disposed on the frame 102. Further, the processing device 3004 may be communicatively coupled with the communication device 3002. Further, the processing device 3004 may be configured for analyzing the at least one first input data. Further, the processing device 3004 may be configured for determining a location on the at least one surface 1402 based on the analyzing. Further, the processing device 3004 may be configured for generating a first command based on the determining. Further, the collapsible unit 100 may include at least one second actuator 3006 (as shown in FIG. 30) operationally coupled with the at least one wheel 120-124. Further, the at least one second actuator 3006 may be communicatively coupled with the processing device 3004. Further, the at least one second actuator 3006 may be configured for moving the at least one wheel 120-124 based on the first command for positioning the collapsible unit 100 in the location on the at least one surface 1402.

Figure 31:
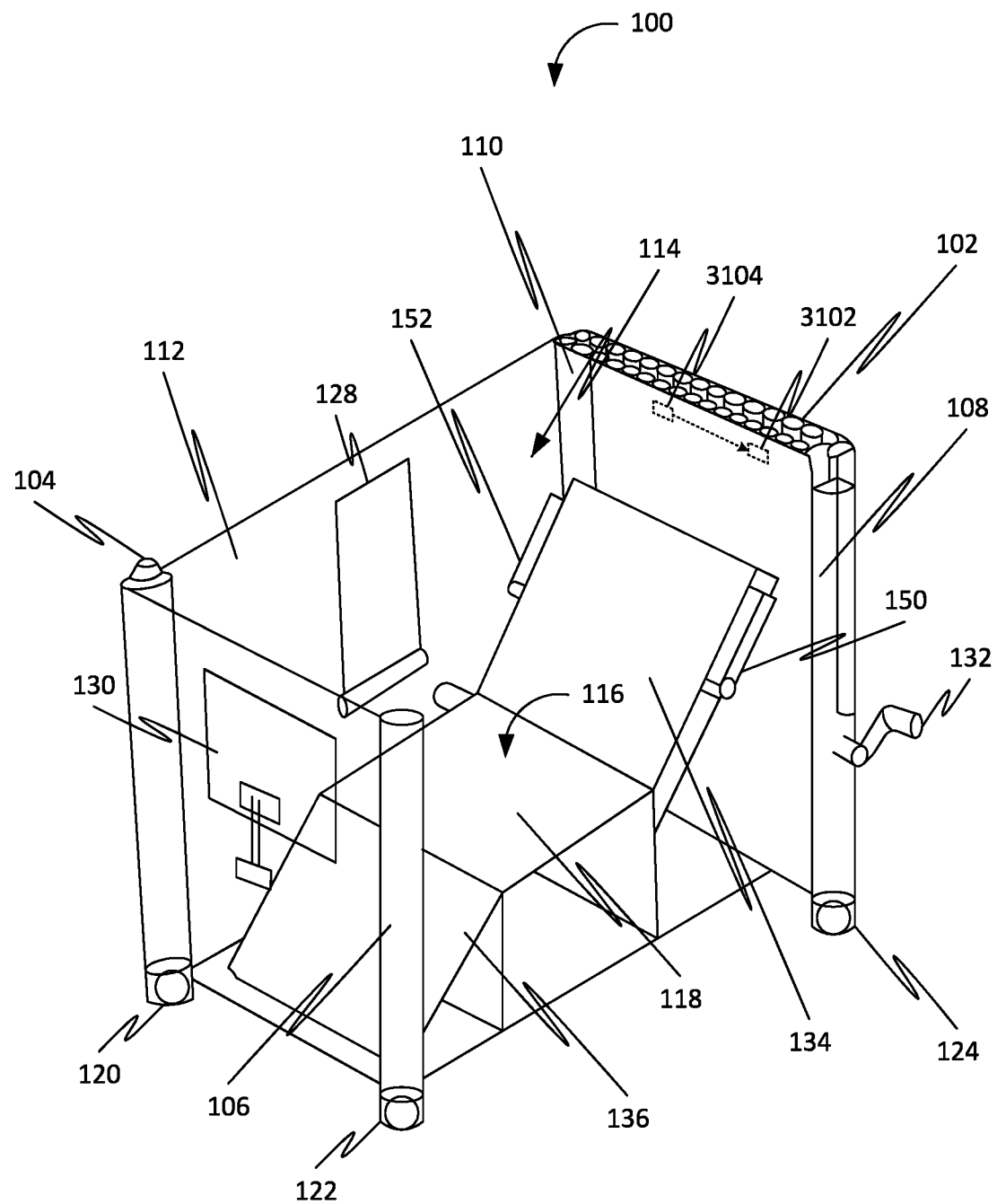
FIG. 31 is a top right side perspective view of the collapsible unit for facilitating multiuse of the collapsible unit, in accordance with some embodiments.

In further embodiments, the collapsible unit 100 may include a plurality of sensors 1404-1410 (as shown in FIG. 14) disposed on the at least one surface 1402. Further, each sensor of the plurality of sensors 1404-1410 may be configured for generating sensor data based on a position of at least one object in relation to the each sensor. Further, the collapsible unit 100 may include a processing device 3104 (as shown in FIG. 31) communicatively coupled with the plurality of sensors 1404-1410. Further, the processing device 3104 may be configured for analyzing the sensor data. Further, the processing device 3104 may be configured for determining a location on the at least one surface 1402 based on the analyzing. Further, the processing device 3104 may be configured for generating a second command based on the determining. Further, the collapsible unit 100 may include at least one third actuator 3102 (as shown in FIG. 31) operationally coupled with the at least one wheel 120-124. Further, the at least one third actuator 3102 may be communicatively coupled with the processing device 3104. Further, the at least one third actuator 3102 may be configured for moving the at least one wheel 120-124 based on the second command for positioning the collapsible unit 100 in the location on the at least one surface 1402.

In further embodiments, the collapsible unit 100 may include at least one arm rest 150-152. Further, the at least one arm rest 150-152 may be coupled with the seat member 116.

Figure 3:
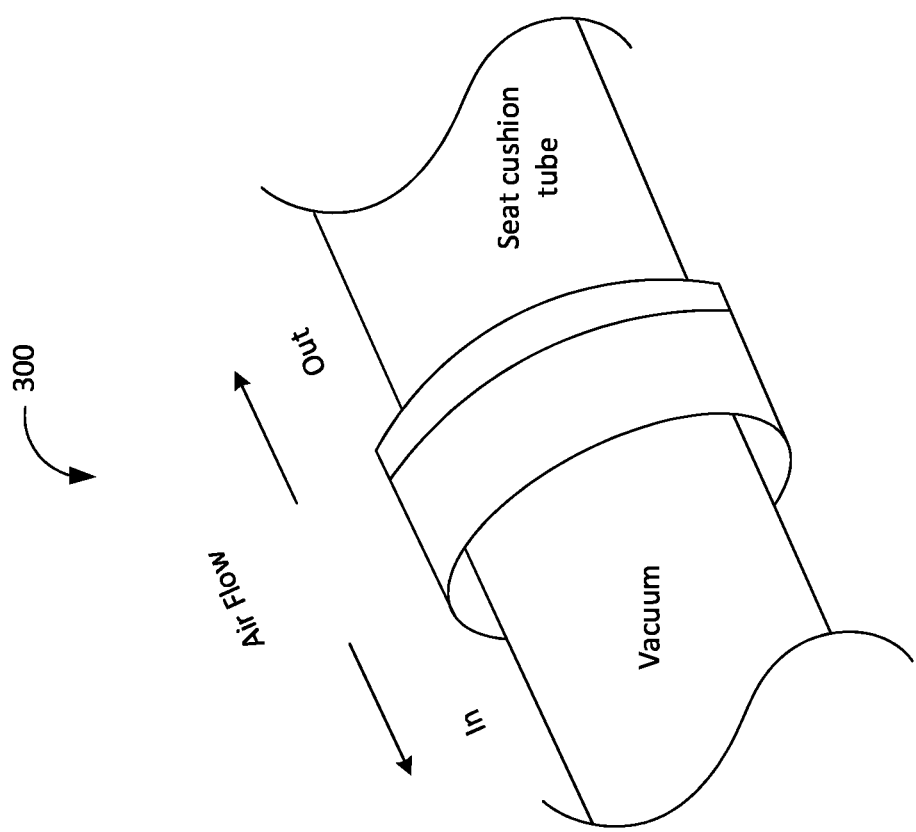
FIG. 3 is a top left side perspective view of the tube, in accordance with some embodiments.

FIG. 2 is a top left side perspective view of the cushion 202 in an inflated state, in accordance with some embodiments. Accordingly, the opening of the cushion 202 may be couplable to a tube 300 (as shown in FIG. 3). Further, the at least one fluid may be transferred to the interior space of the cushion 202 using the tube 300. Further, the at least one fluid may be air. Further, the cushion 202 may be transitioned to the inflated state based on the transferring of the at least one fluid into the interior space.

FIG. 3 is a top left side perspective view of the tube 300, in accordance with some embodiments.

Figure 4:
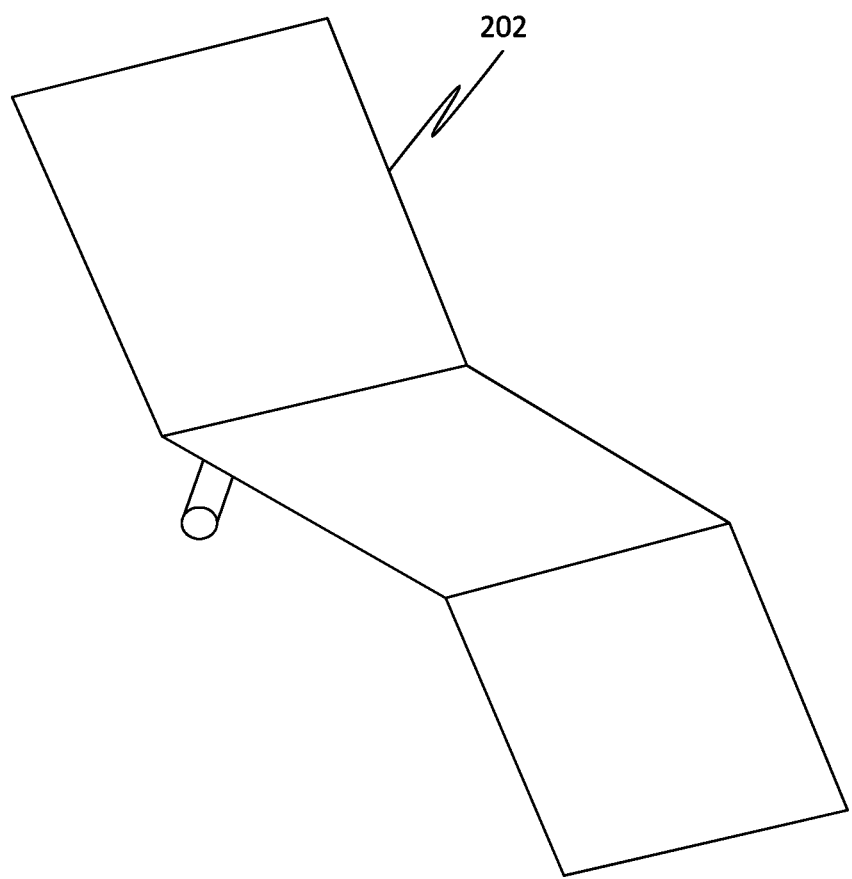
FIG. 4 is a top left side perspective view of the cushion in a deflated state, in accordance with some embodiments.

FIG. 4 is a top left side perspective view of the cushion 202 in a deflated state, in accordance with some embodiments. Accordingly, the at least one fluid may exit from the interior space of the cushion 202 using the tube 300. Further, the cushion 202 may be transitioned to the deflated state based on the exit of the at least one fluid from the interior space.

Figure 5:
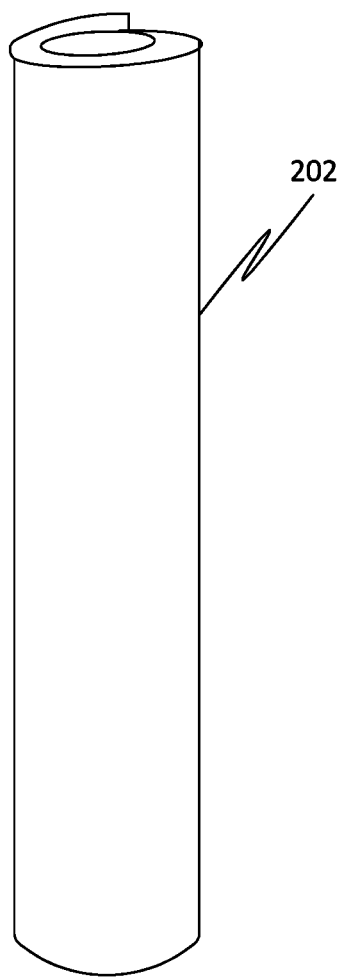
FIG. 5 is a top left side perspective view of the cushion in a rolled state, in accordance with some embodiments.

FIG. 5 is a top left side perspective view of the cushion 202 in a rolled state, in accordance with some embodiments.

Figure 6:
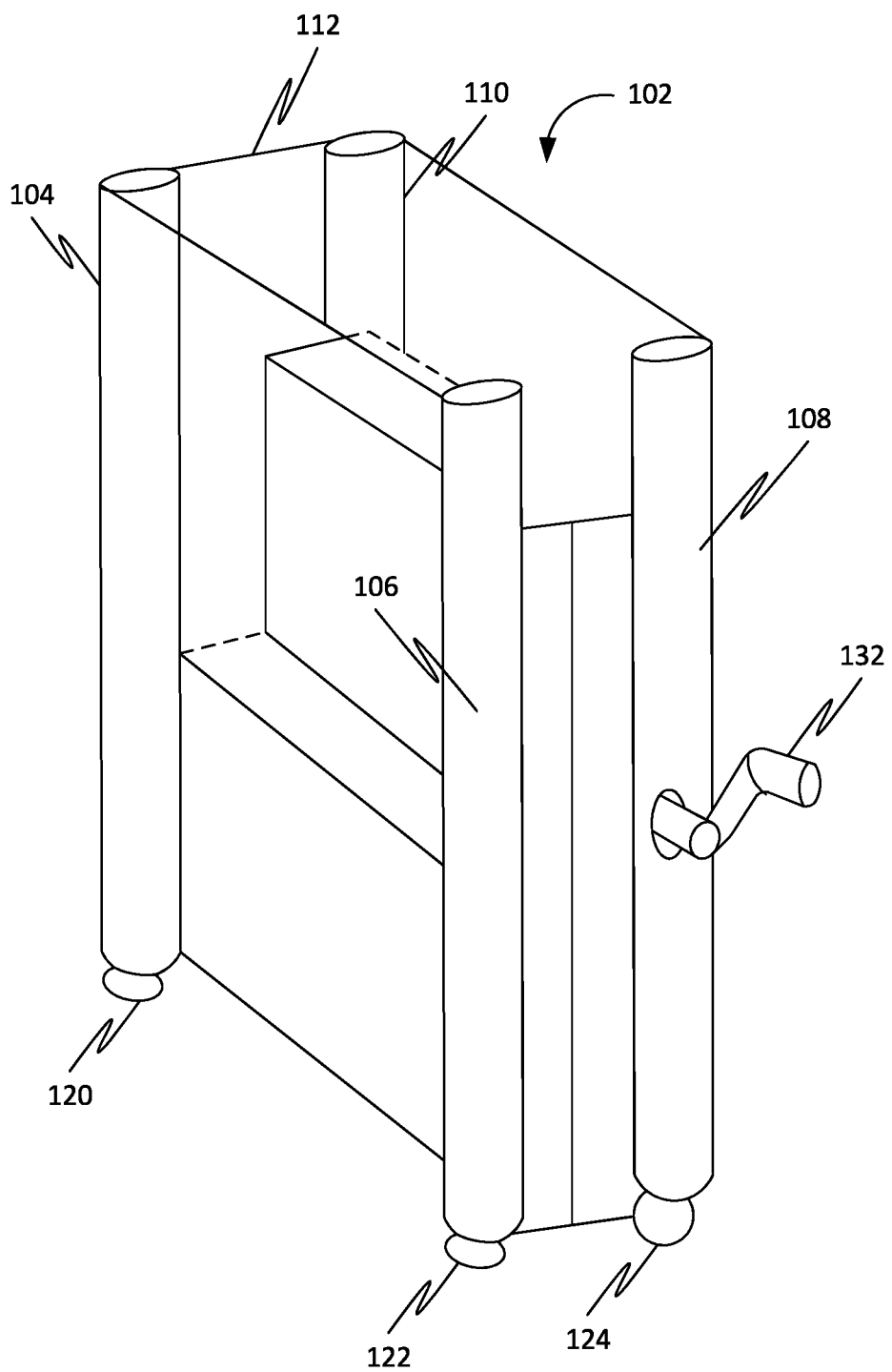
FIG. 6 is a top right side perspective view of the frame in the collapsed state, in accordance with some embodiments.

FIG. 6 is a top right side perspective view of the frame 102 in the collapsed state, in accordance with some embodiments.

Figure 7:
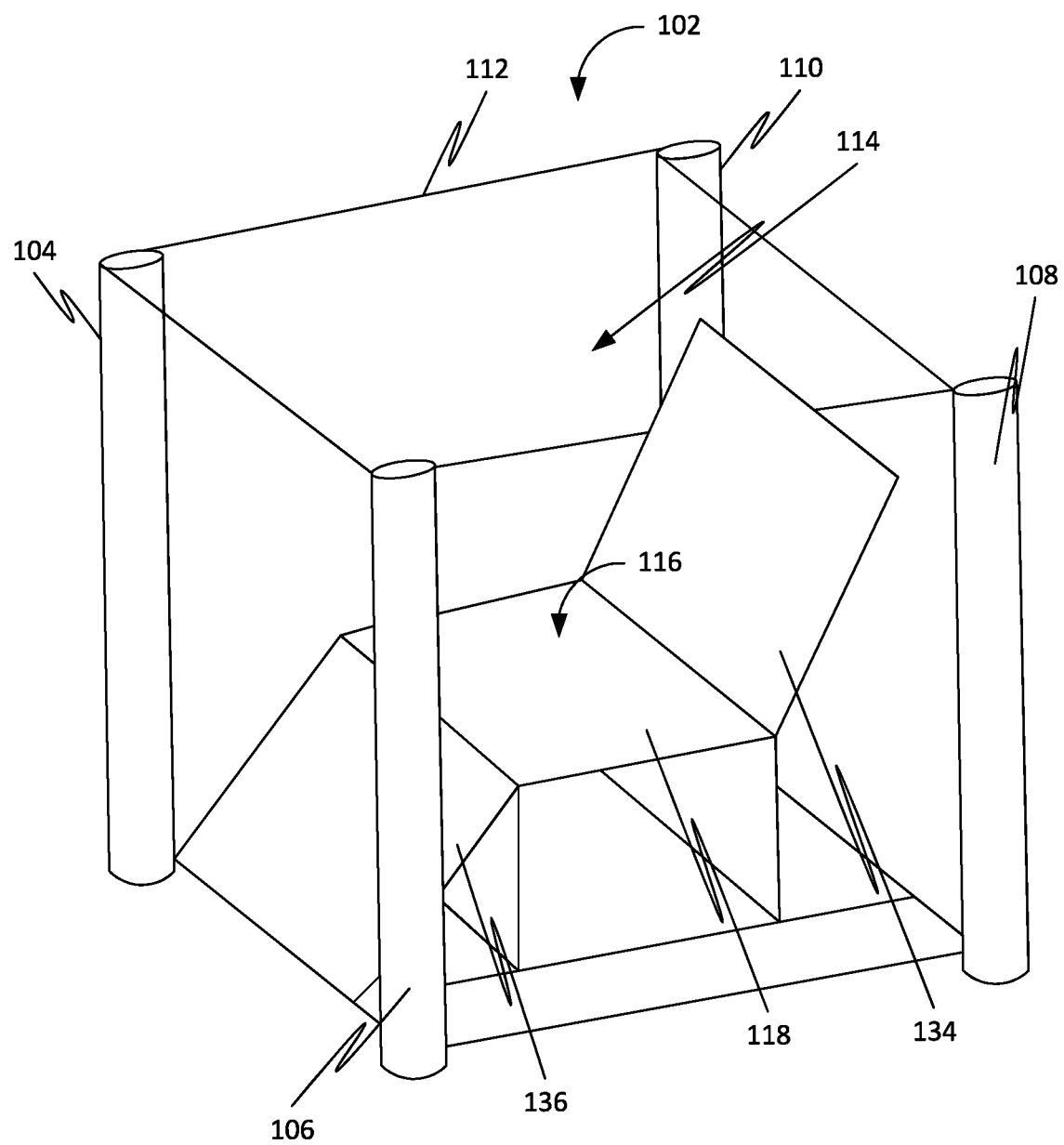
FIG. 7 is a top right side perspective view of the frame in the at least one extended state, in accordance with some embodiments.

FIG. 7 is a top right side perspective view of the frame 102 in the at least one extended state, in accordance with some embodiments.

Figure 8:
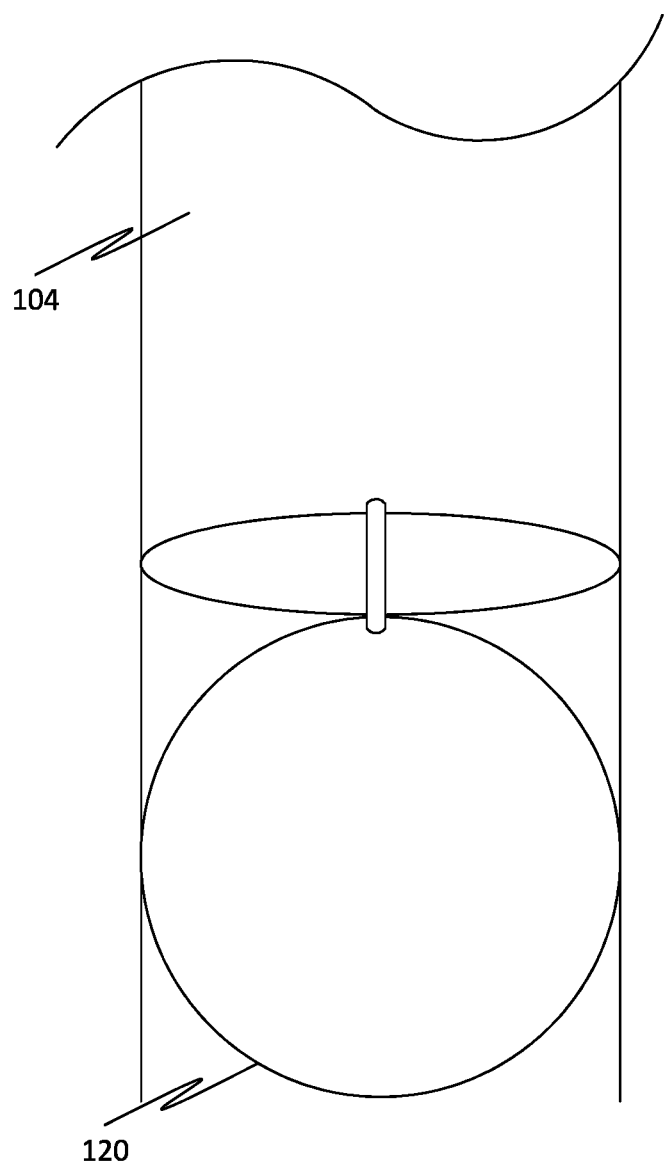
FIG. 8 is a front view of the wheel of the at least one wheel in the wheel retracted state, in accordance with some embodiments.

FIG. 8 is a front view of the wheel of the at least one wheel 120-124 in the wheel retracted state, in accordance with some embodiments.

Figure 9:
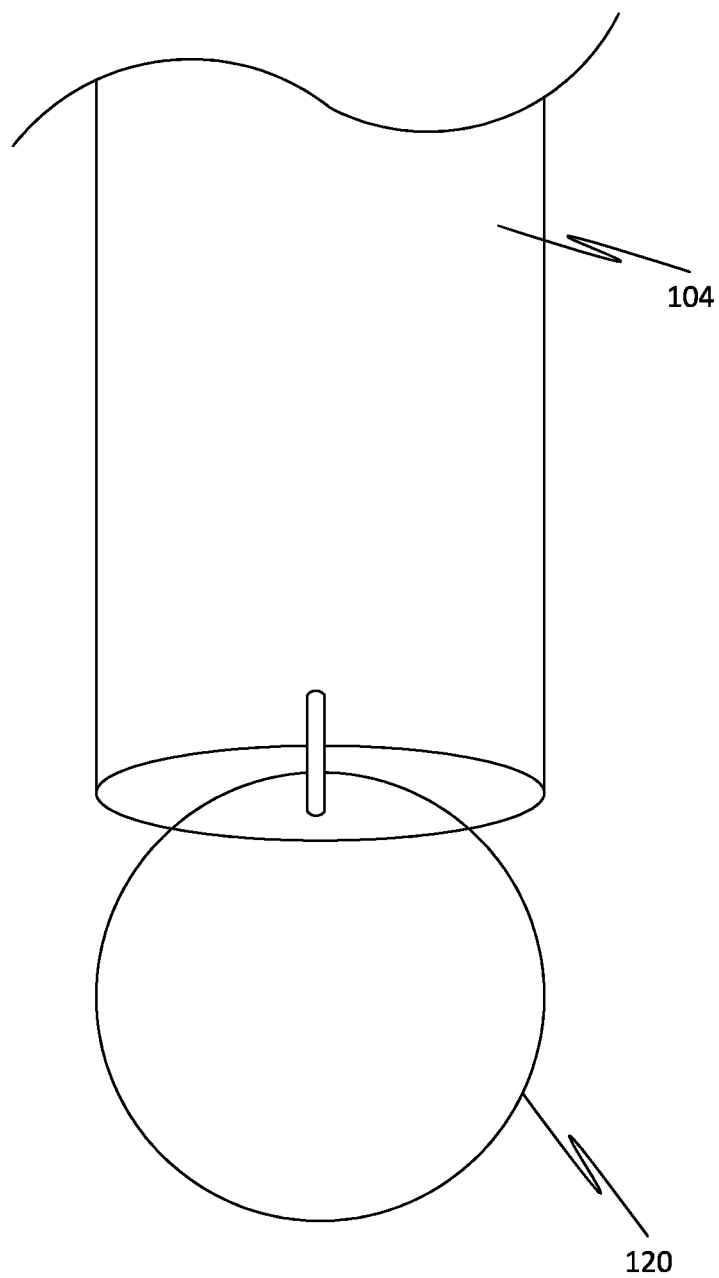
FIG. 9 is a front view of the wheel of the at least one wheel in the wheel extended state, in accordance with some embodiments.

FIG. 9 is a front view of the wheel of the at least one wheel 120-124 in the wheel extended state, in accordance with some embodiments.

Figure 10:
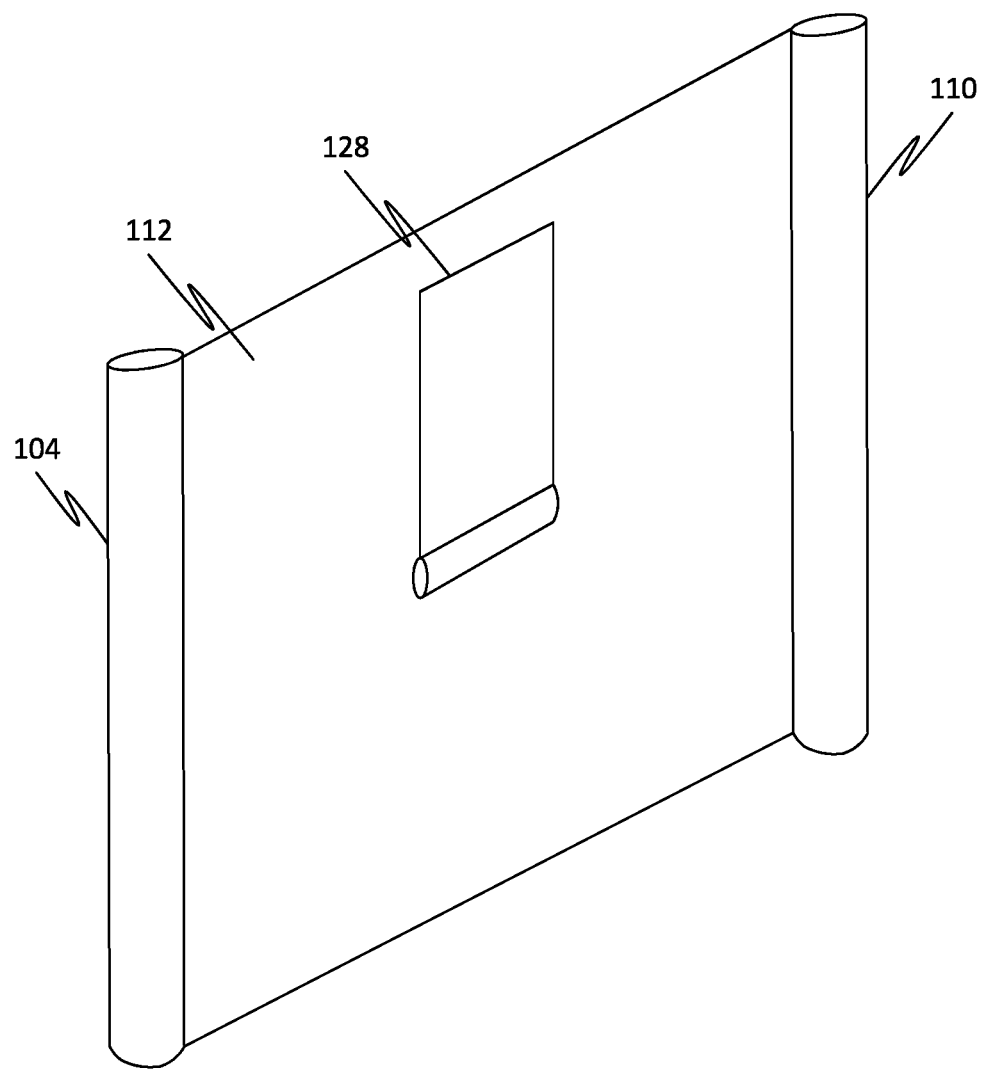
FIG. 10 is a top right side perspective view of the drop-down desk in the desk close state, in accordance with some embodiments.

FIG. 10 is a top right side perspective view of the drop-down desk 128 in the desk close state, in accordance with some embodiments.

Figure 11:
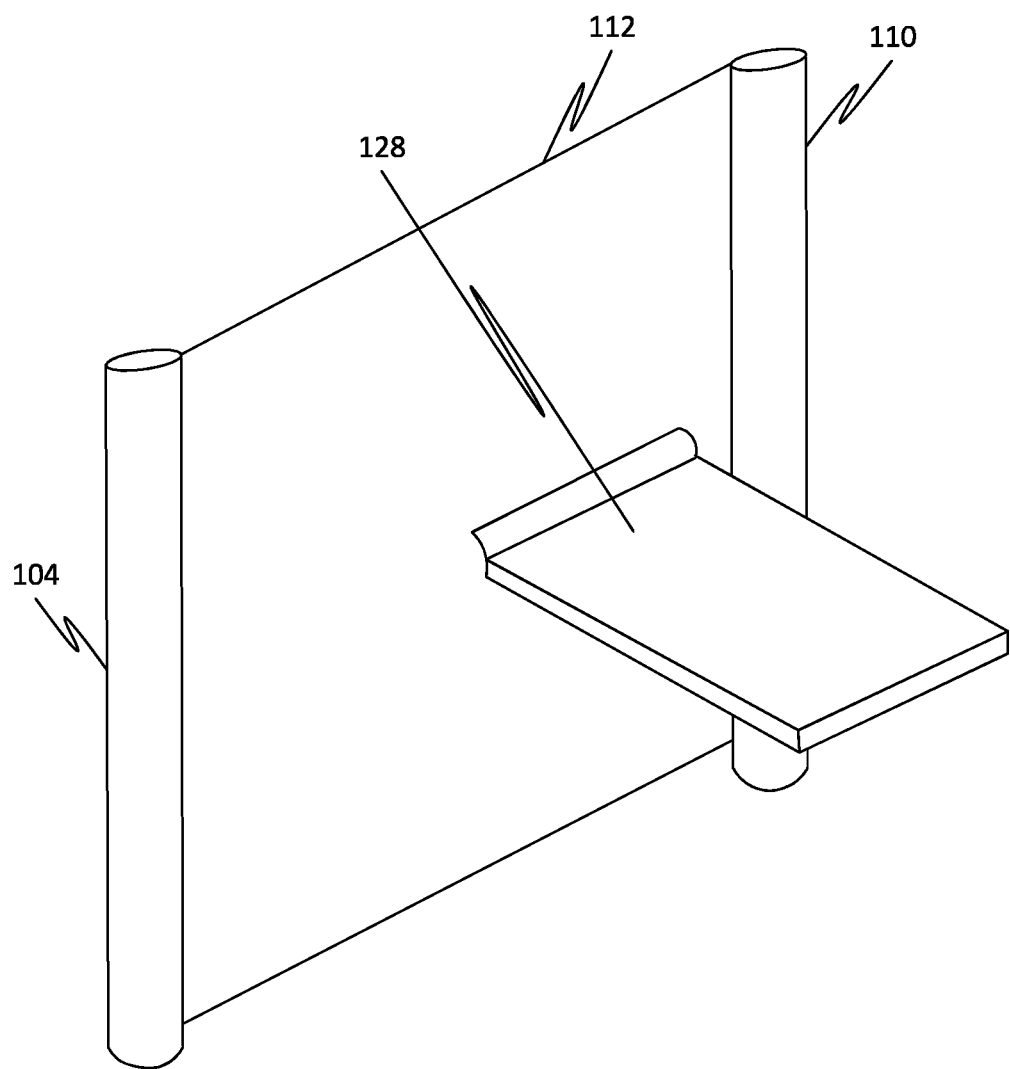
FIG. 11 is a top right side perspective view of the drop-down desk in the at least one desk open state, in accordance with some embodiments.

FIG. 11 is a top right side perspective view of the drop-down desk 128 in the at least one desk open state, in accordance with some embodiments.

Figure 12:
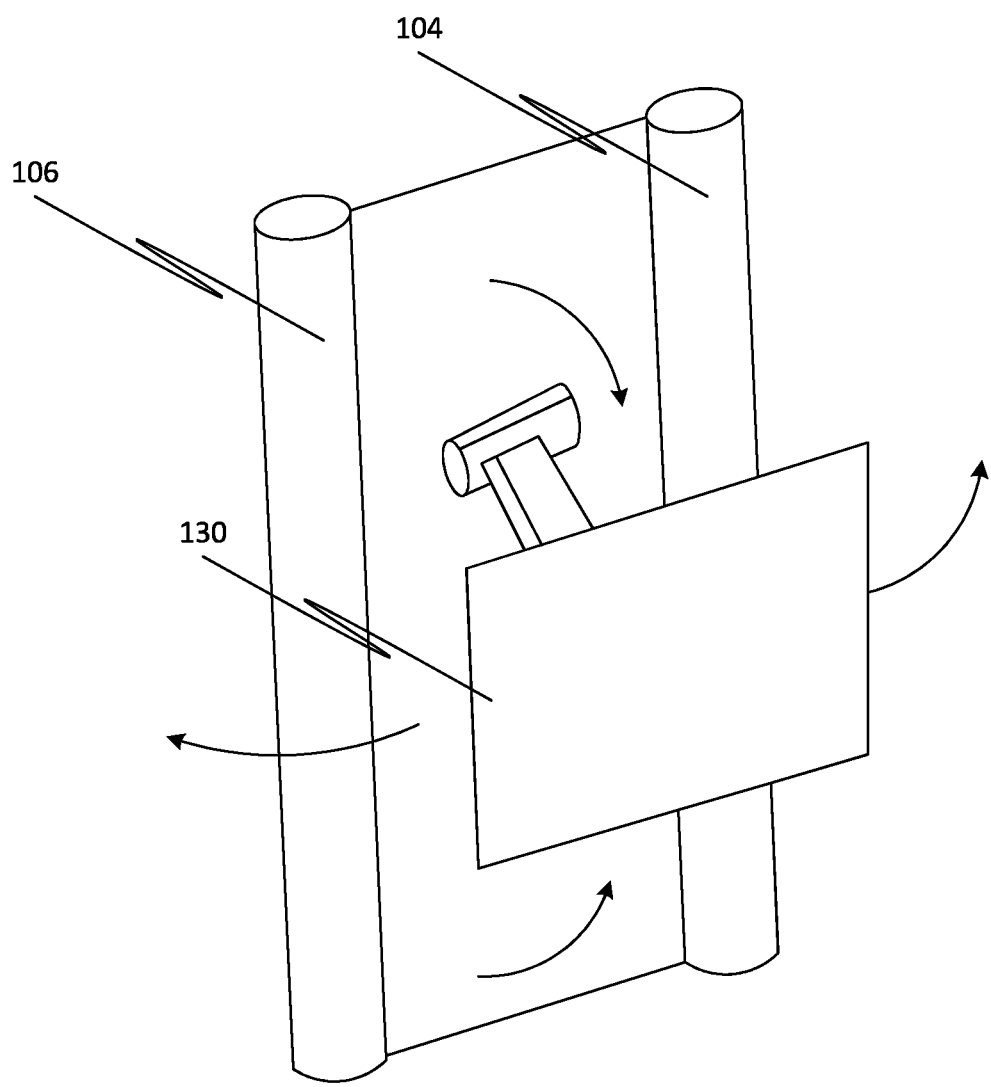
FIG. 12 is a top right side perspective view of the at least one interface device, in accordance with some embodiments.

FIG. 12 is a top right side perspective view of the at least one interface device 130, in accordance with some embodiments.

Figure 13:
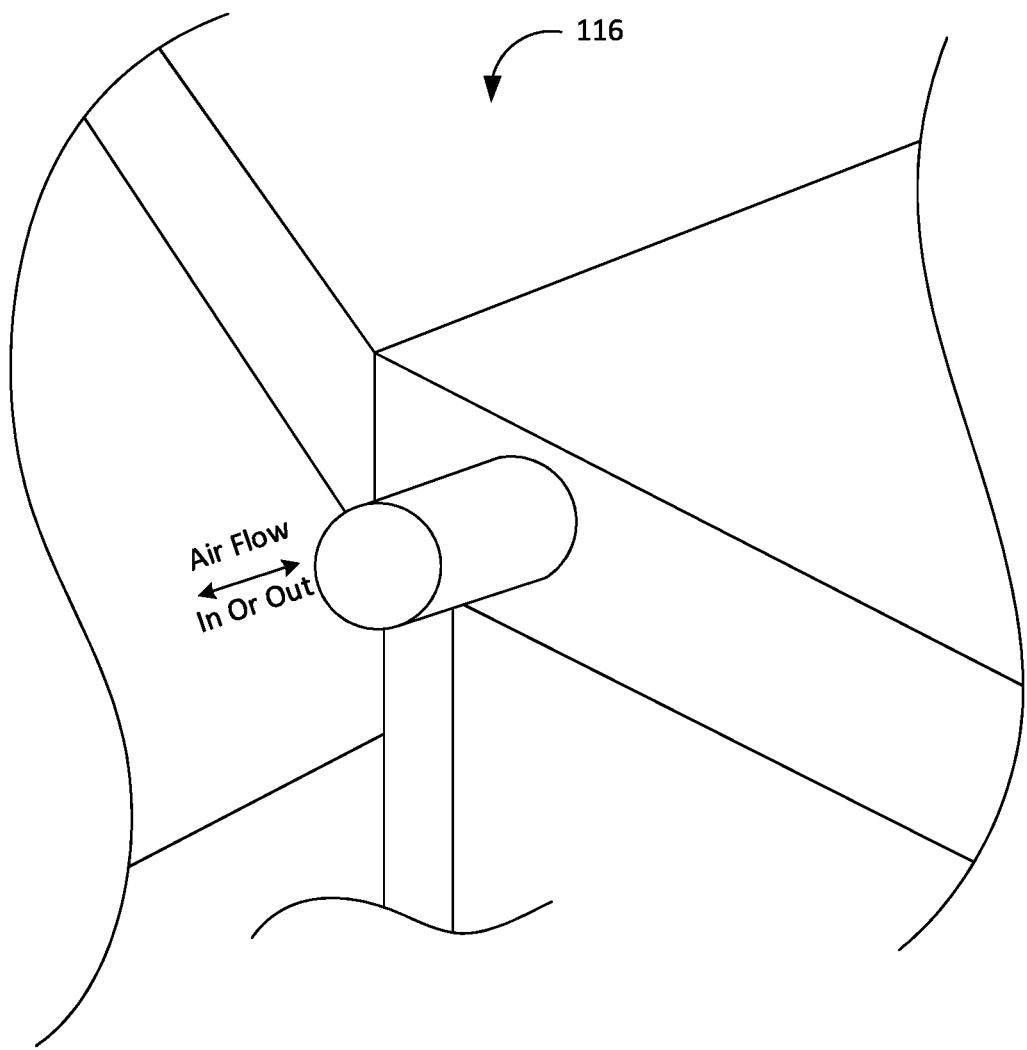
FIG. 13 is a partial top left side perspective view of the cushion, in accordance with some embodiments.

FIG. 13 is a partial top left side perspective view of the cushion 202, in accordance with some embodiments.

FIG. 14 is a schematic of a communication network associated with the collapsible unit 100, in accordance with some embodiments.

Figure 15:
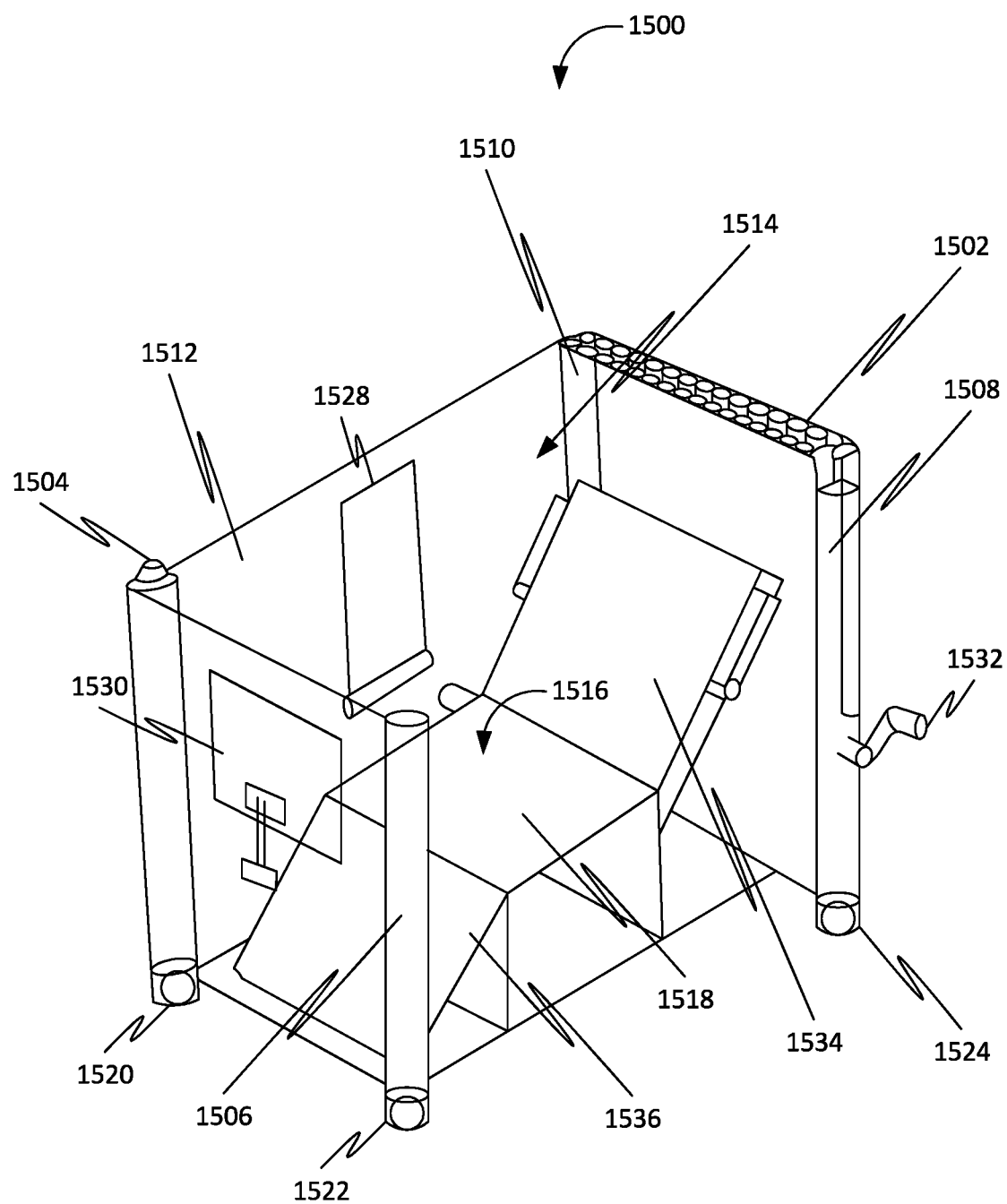
FIG. 15 is a top right side perspective view of a collapsible unit for facilitating multiuse of the collapsible unit, in accordance with some embodiments.
Figure 28:
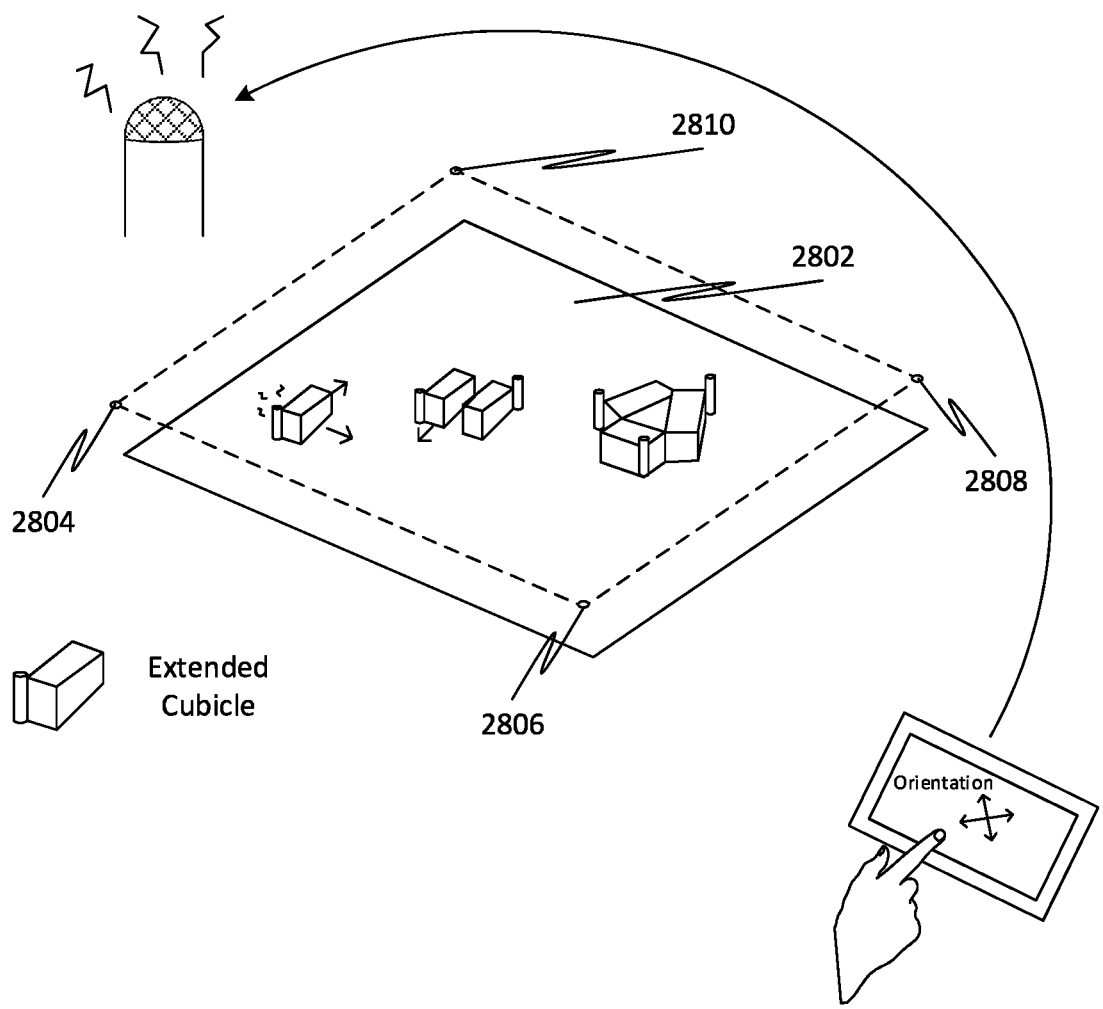
FIG. 28 is a schematic of a communication network associated with the collapsible unit, in accordance with some embodiments.

FIG. 15 is a top right side perspective view of a collapsible unit 1500 for facilitating multiuse of the collapsible unit 1500, in accordance with some embodiments. Accordingly, the collapsible unit 1500 may be deployable on at least one surface 2802 (as shown in FIG. 28). Further, the collapsible unit 1500 may include a frame 1502. Further, the frame 1502 may include a plurality of primary members 1504-1510 disposed vertically in relation to the at least one surface 2802. Further, the frame 1502 may include at least one secondary member 1512 coupled with the plurality of primary members 1504-1510. Further, a first end of a secondary member of the at least one secondary member 1512 may be coupled to a first primary member of the plurality of primary members 1504-1510 and a second end of the secondary member may be coupled to a second primary member of the plurality of primary members 1504-1510. Further, the plurality of primary members 1504-1510 movably positionable to a plurality of positions for transitioning the at least one secondary member 1512 between at least one member extended state and a folded state. Further, the transitioning of the at least one secondary member 1512 transitions the frame 1502 between at least one extended state and a collapsed state. Further, the plurality of primary members 1504-1510 and the at least one secondary member 1512 forms an enclosure 1514 and at least one opening leading into the enclosure 1514 in the at least one extended state. Further, the plurality of primary members 1504-1510 does not form the enclosure 1514 in the collapsed state. Further, the collapsible unit 1500 may include a seat member 1516 disposed in the frame 1502. Further, the seat member 1516 may be transitionable between at least one seat extended state and a seat collapsed state based on transitioning of the frame 1502 between the at least one extended state and the collapsed state. Further, the seat member 1516 may include a seat panel 1518 disposed in the enclosure 1514. Further, the seat panel 1518 may be substantially perpendicular to the plurality of primary members 1504-1510 in the at least one seat extended state. Further, the seat panel 1518 may be substantially parallel to the plurality of primary members 1504-1510 in the seat collapsed state. Further, the collapsible unit 1500 may include at least one wheel 1520-1524 coupled to the frame 1502. Further, the at least one wheel 1520-1524 may be configured for moving the collapsible unit 1500 on the at least one surface 2802. Further, the at least one wheel 1520-1524 may be configured for positioning the plurality of primary members 1504-1510 to the plurality of positions based on the moving of the at least one wheel 1520-1524.

In further embodiments, the collapsible unit 1500 may include at least one curtain coupled with the frame 1502 using at least one curtain coupling mechanism. Further, the at least one curtain may include at least one curtain panel retractably extended between the first primary member and the second primary member covering the at least one opening of the frame 1502. Further, the covering of the at least one opening conceals the enclosure 1514.

Figure 16:
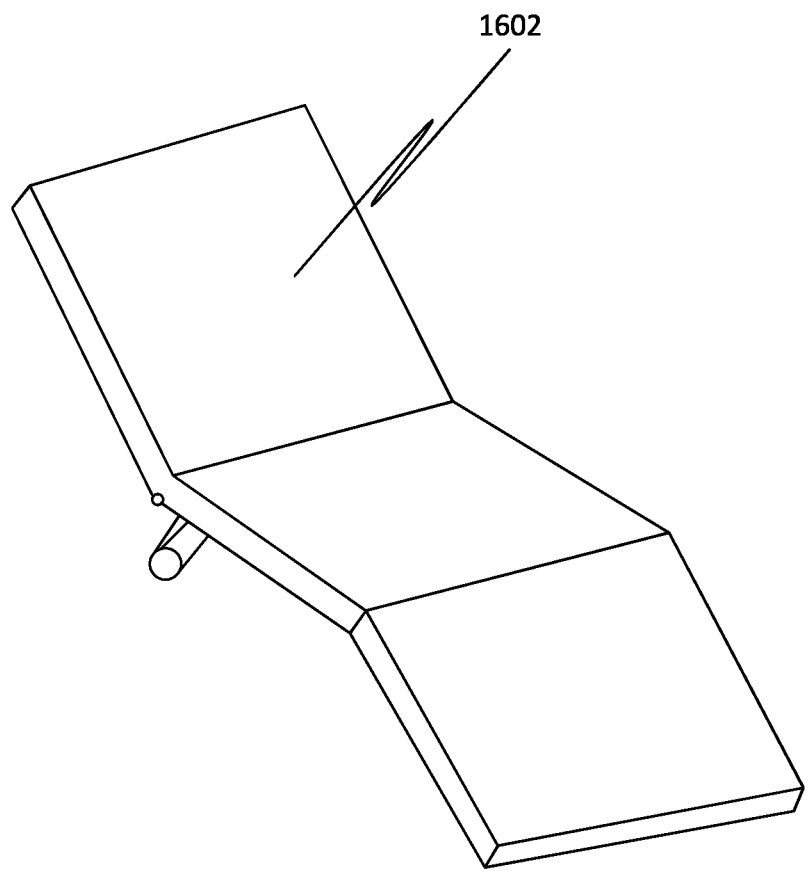
FIG. 16 is a top left side perspective view of the cushion in an inflated state, in accordance with some embodiments

In further embodiments, the collapsible unit 1500 may include a cushion 1602 (as shown in FIG. 16) coupled with the seat member 1516. Further, the cushion 1602 may include a top panel and a bottom panel. Further, a periphery of the top panel may be attached to a periphery of the bottom panel for forming an interior space and an opening leading into the interior space. Further, the cushion 1602 may be inflatably deflatable based on receivably removing of at least one fluid from the interior space through the opening.

Further, in some embodiments, a wheel of the at least one wheel 1520-1524 may be configured for retractably extending from a base end of a primary member of the plurality of primary members 1504-1510. Further, the wheel may be configured for transitioning between a wheel retracted state and a wheel extended state based on the retractably extending of the wheel. Further, the wheel protrudes from the base end in the wheel extended state. Further, the wheel does not protrude from the base end in the wheel retracted state. Further, the wheel moves the collapsible unit 1500 in the wheel extended state. Further, the wheel does not move the collapsible unit 1500 in the wheel retracted state.

In further embodiments, the collapsible unit 1500 may include a drop-down desk 1528 coupled to the frame 1502. Further, the drop-down desk 1528 may include at least one desk panel. Further, a first end of the at least one desk panel may be rotatably attached to the frame 1502. Further, the drop-down desk 1528 may be transitionable between a desk closed state and at least one desk open state. Further, the at least one desk panel may be disposed in the enclosure 1514. Further, the at least one desk panel may be substantially perpendicular to at least one primary member of the plurality of primary members 1504-1510 in the at least one desk open state. Further, the at least one desk panel may be substantially parallel to the at least one primary member in the desk closed state.

In further embodiments, the collapsible unit 1500 may include a handle crank assembly 1532 operationally coupled with the frame 1502. Further, the handle crank assembly 1532 may be configured for receiving at least one external force. Further, the handle crank assembly 1532 may be configured for transitioning the frame 1502 between the at least one extended state and the collapsed state based on the receiving of the at least one external force.

Further, in some embodiments, the seat member 1516 may include a backrest panel 1534 and a footrest panel 1536. Further, the first primary member opposes the second primary member. Further, a first end of the footrest panel 1536 may be pivotally coupled to a base end of the first primary member and a second end of the footrest panel 1536 may be pivotally coupled to a first end of the seat panel 1518 and a second end of the seat panel 1518 may be pivotally coupled with a first end of the backrest panel 1534 and a second end of the backrest panel 1534 may be pivotally coupled with a top end of the second primary member. Further, the footrest panel 1536 and the backrest panel 1534 may be substantially perpendicular to the seat panel 1518 in the at least one seat extended state. Further, the footrest panel 1536 and the backrest panel 1534 may be substantially parallel to the seat panel 1518 in the seat collapsed state.

Figure 17:
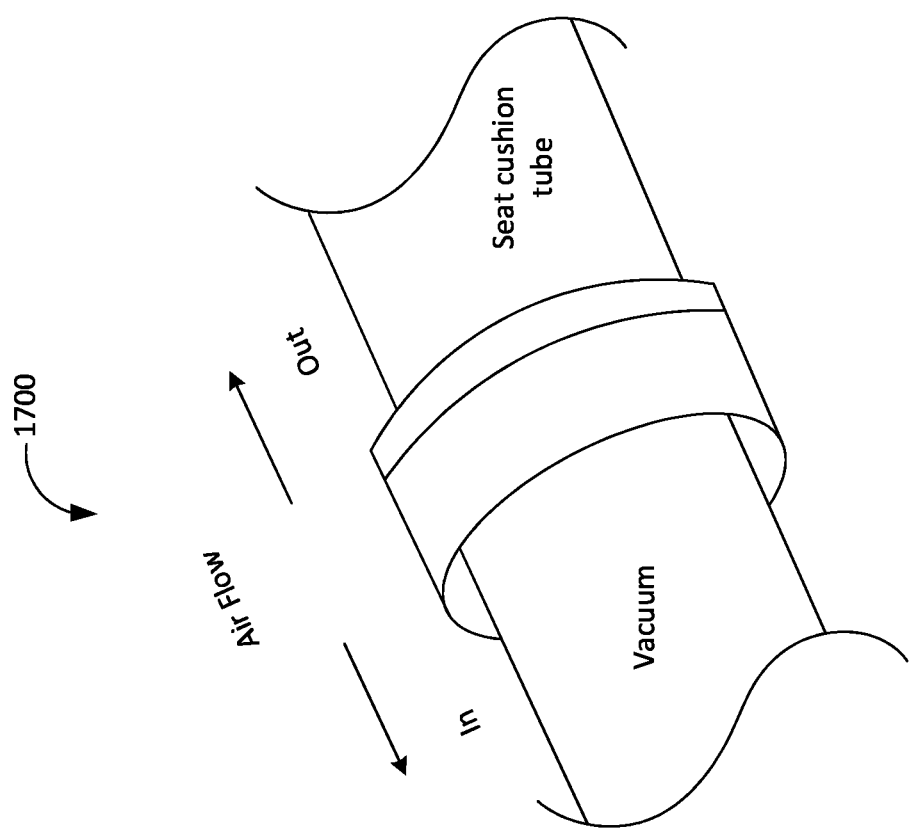
FIG. 17 is a top left side perspective view of the tube, in accordance with some embodiments.

FIG. 16 is a top left side perspective view of the cushion 1602 in an inflated state, in accordance with some embodiments. Accordingly, the opening of the cushion 1602 may be couplable to a tube 1700 (as shown in FIG. 17). Further, the at least one fluid may be transferred to the interior space of the cushion 1602 using the tube 1700. Further, the cushion 1602 may be transitioned to the inflated state based on the transferring of the at least one fluid into the interior space.

FIG. 17 is a top left side perspective view of the tube 1700, in accordance with some embodiments.

Figure 18:
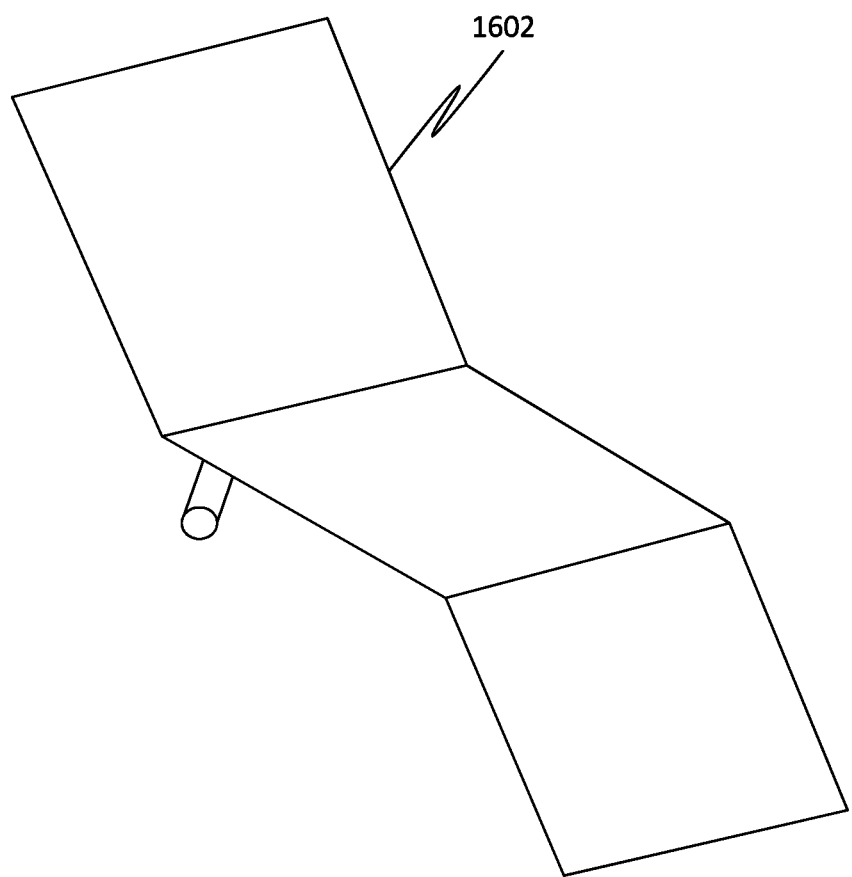
FIG. 18 is a top left side perspective view of the cushion in a deflated state, in accordance with some embodiments.

FIG. 18 is a top left side perspective view of the cushion 1602 in a deflated state, in accordance with some embodiments. Accordingly, the at least one fluid may exit from the interior space of the cushion 1602 using the tube 1700. Further, the cushion 1602 may be transitioned to the deflated state based on the exit of the at least one fluid from the interior space.

Figure 19:
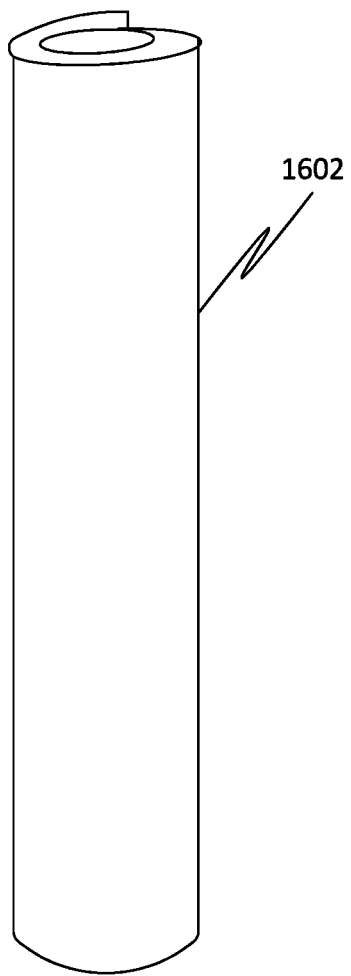
FIG. 19 is a top left side perspective view of the cushion in a rolled state, in accordance with some embodiments.

FIG. 19 is a top left side perspective view of the cushion 1602 in a rolled state, in accordance with some embodiments.

Figure 20:
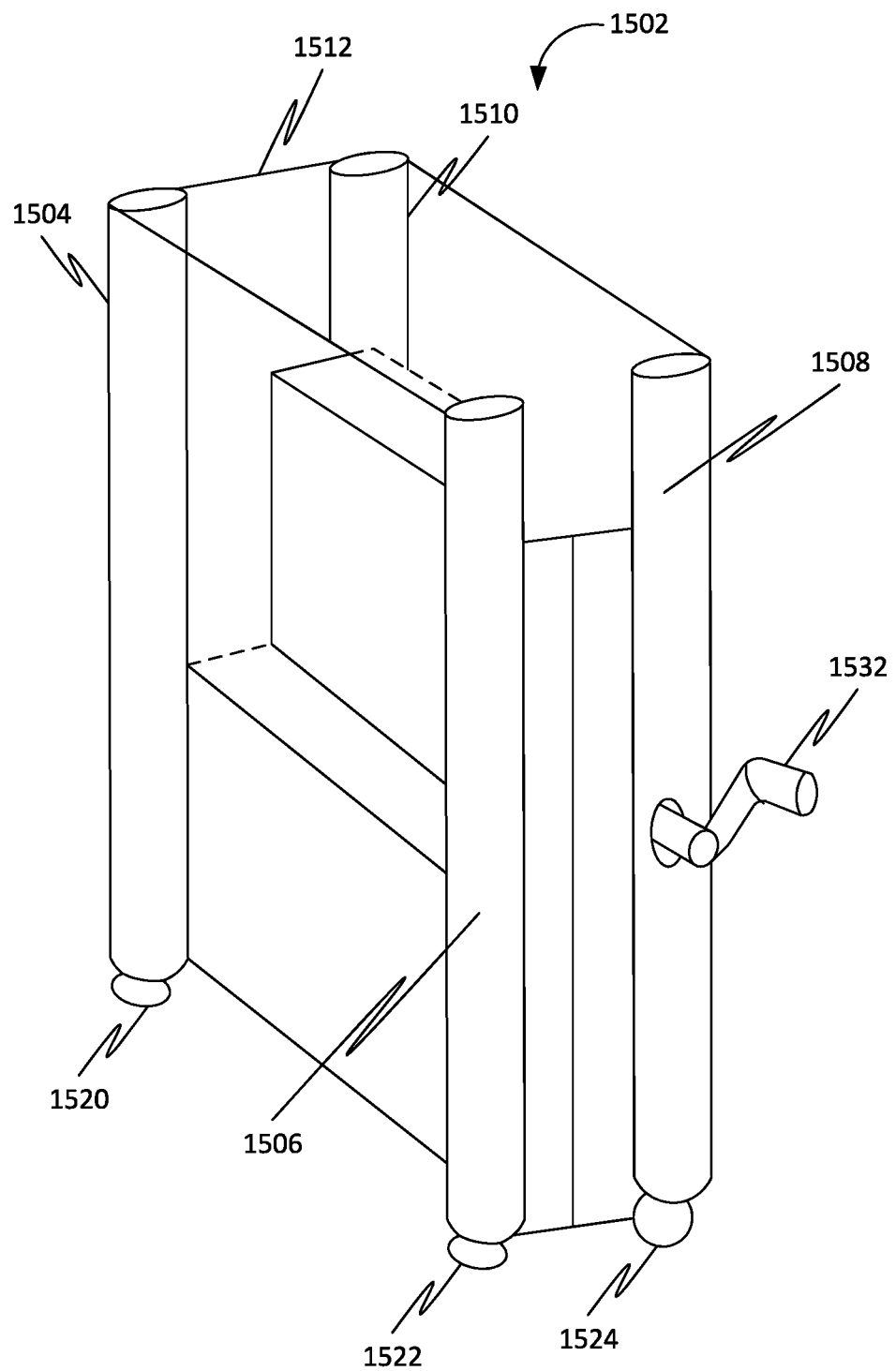
FIG. 20 is a top right side perspective view of the frame in the collapsed state, in accordance with some embodiments.

FIG. 20 is a top right side perspective view of the frame 1502 in the collapsed state, in accordance with some embodiments.

Figure 21:
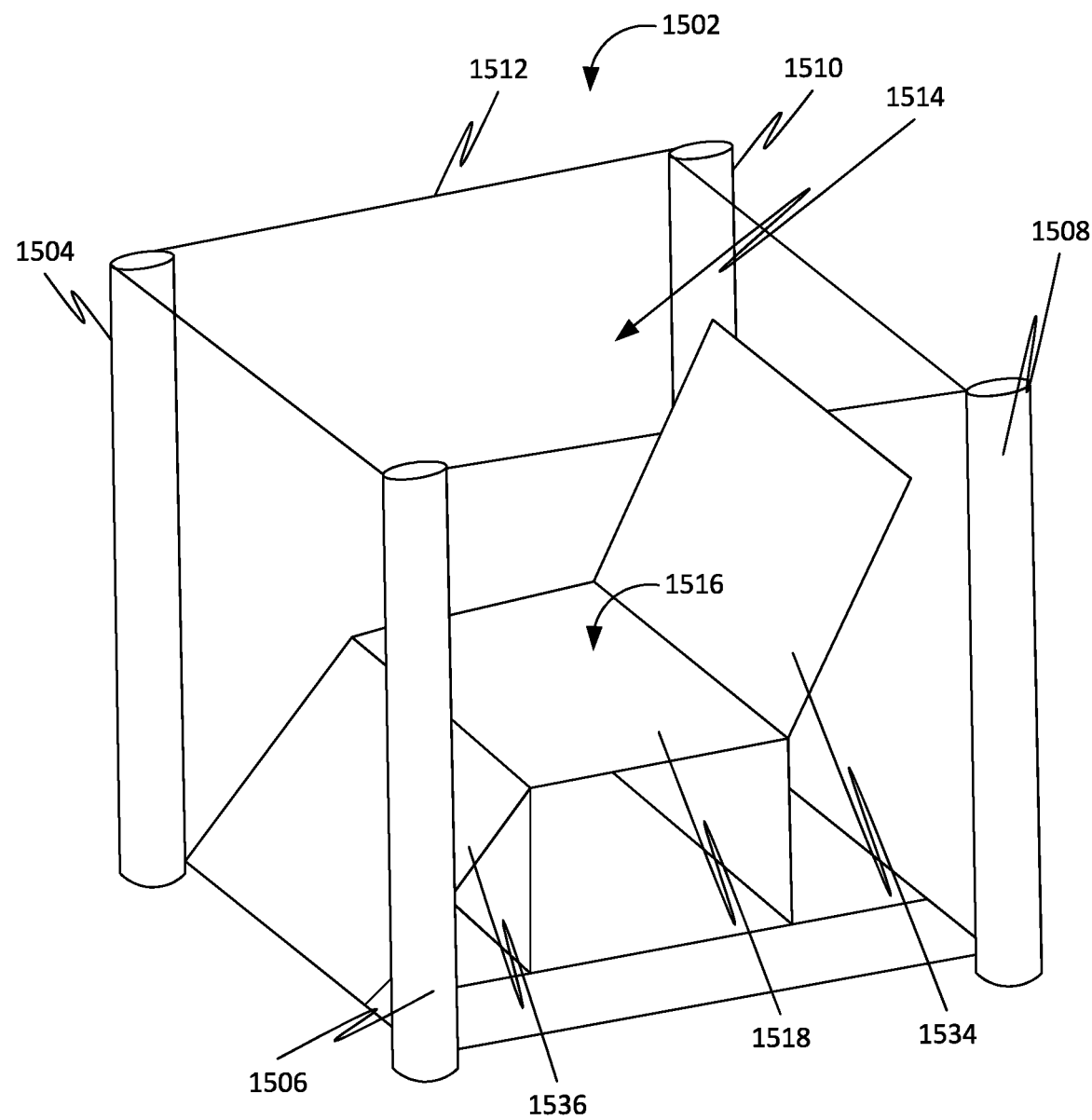
FIG. 21 is a top right side perspective view of the frame in the at least one extended state, in accordance with some embodiments.

FIG. 21 is a top right side perspective view of the frame 1502 in the at least one extended state, in accordance with some embodiments.

Figure 22:
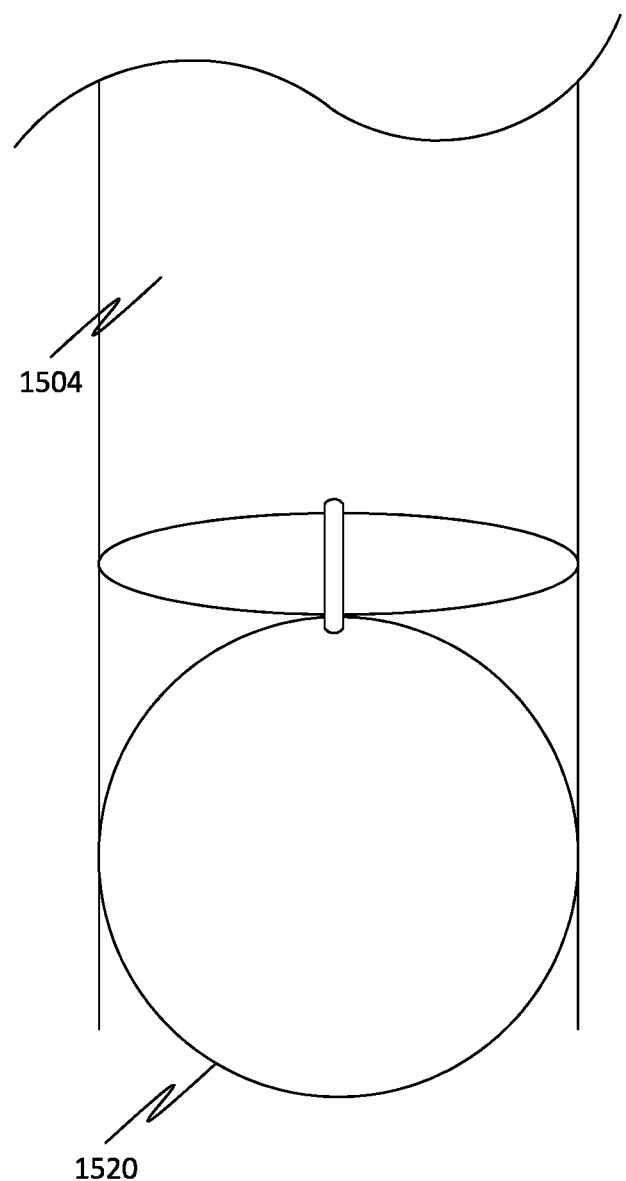
FIG. 22 is a front view of the wheel of the at least one wheel in the wheel retracted state, in accordance with some embodiments.

FIG. 22 is a front view of the wheel of the at least one wheel 1520-1524 in the wheel retracted state, in accordance with some embodiments.

Figure 23:
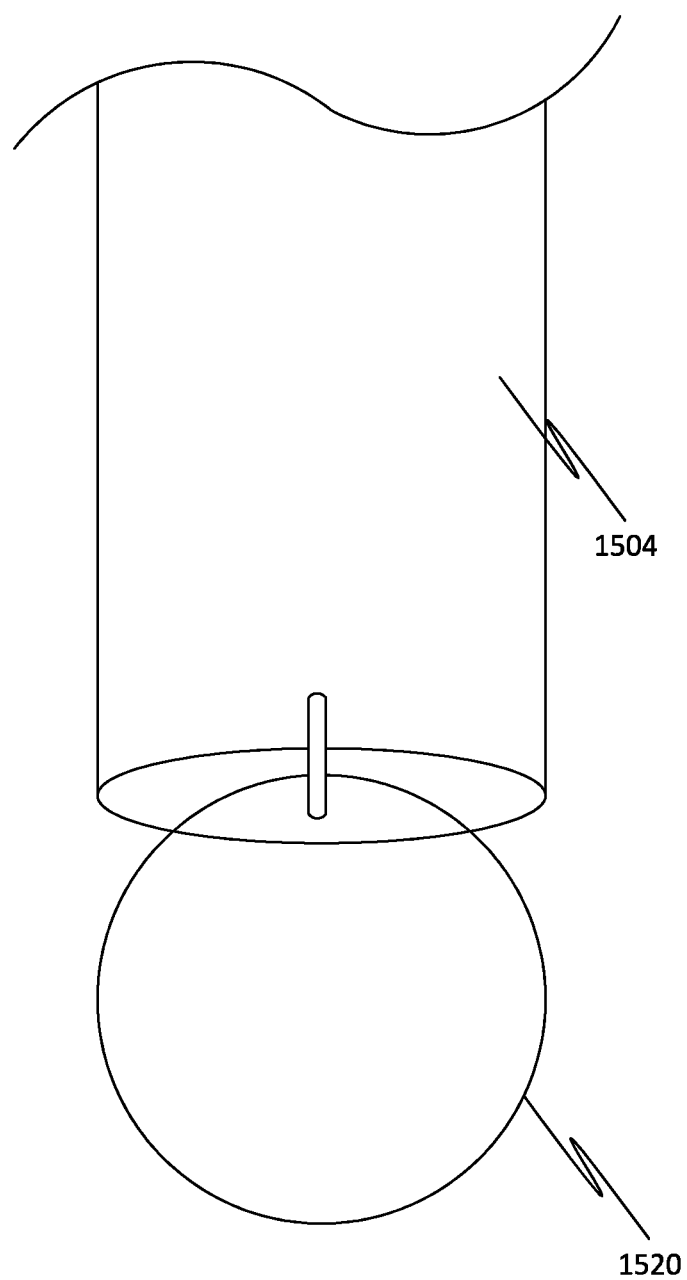
FIG. 23 is a front view of the wheel of the at least one wheel in the wheel extended state, in accordance with some embodiments.

FIG. 23 is a front view of the wheel of the at least one wheel 1520-1524 in the wheel extended state, in accordance with some embodiments.

Figure 24:
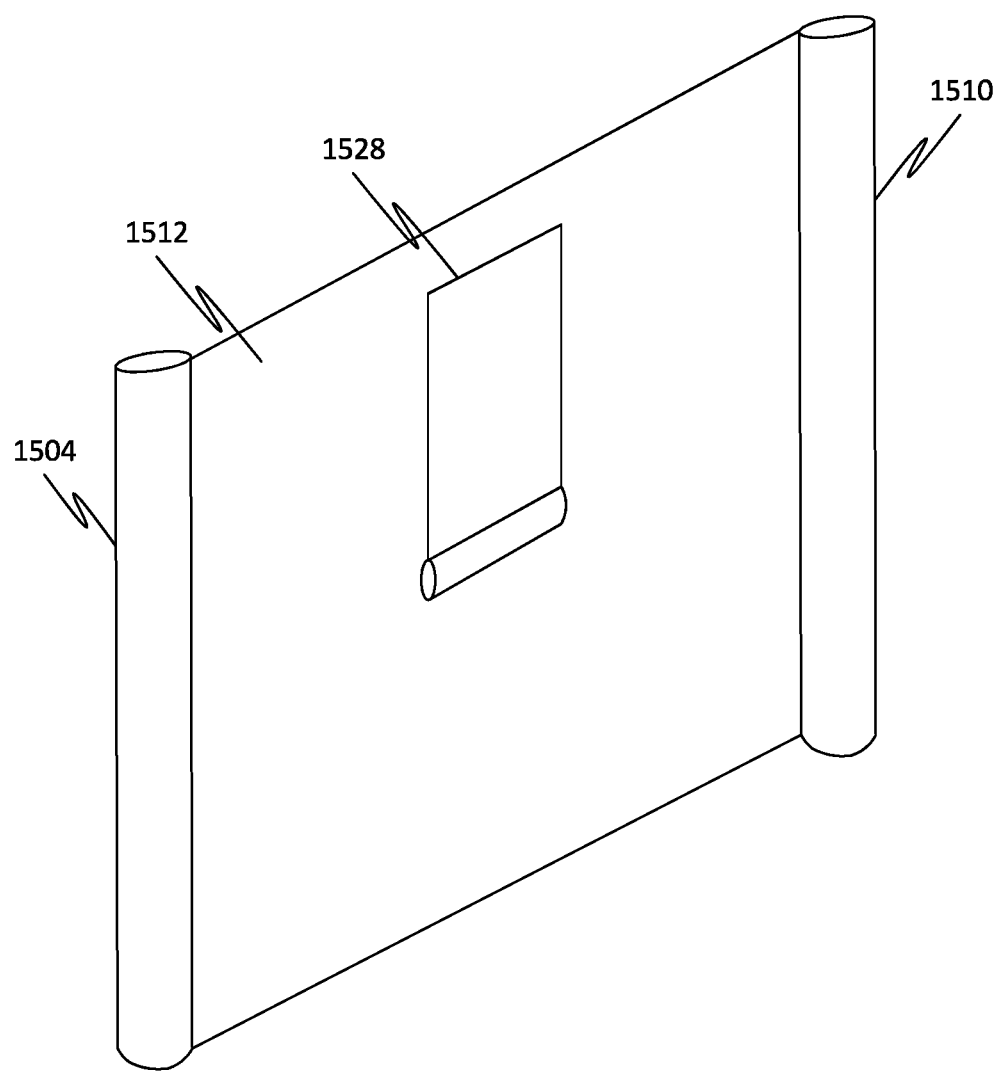
FIG. 24 is a top right side perspective view of the drop-down desk in the desk close state, in accordance with some embodiments.

FIG. 24 is a top right side perspective view of the drop-down desk 1528 in the desk close state, in accordance with some embodiments.

Figure 25:
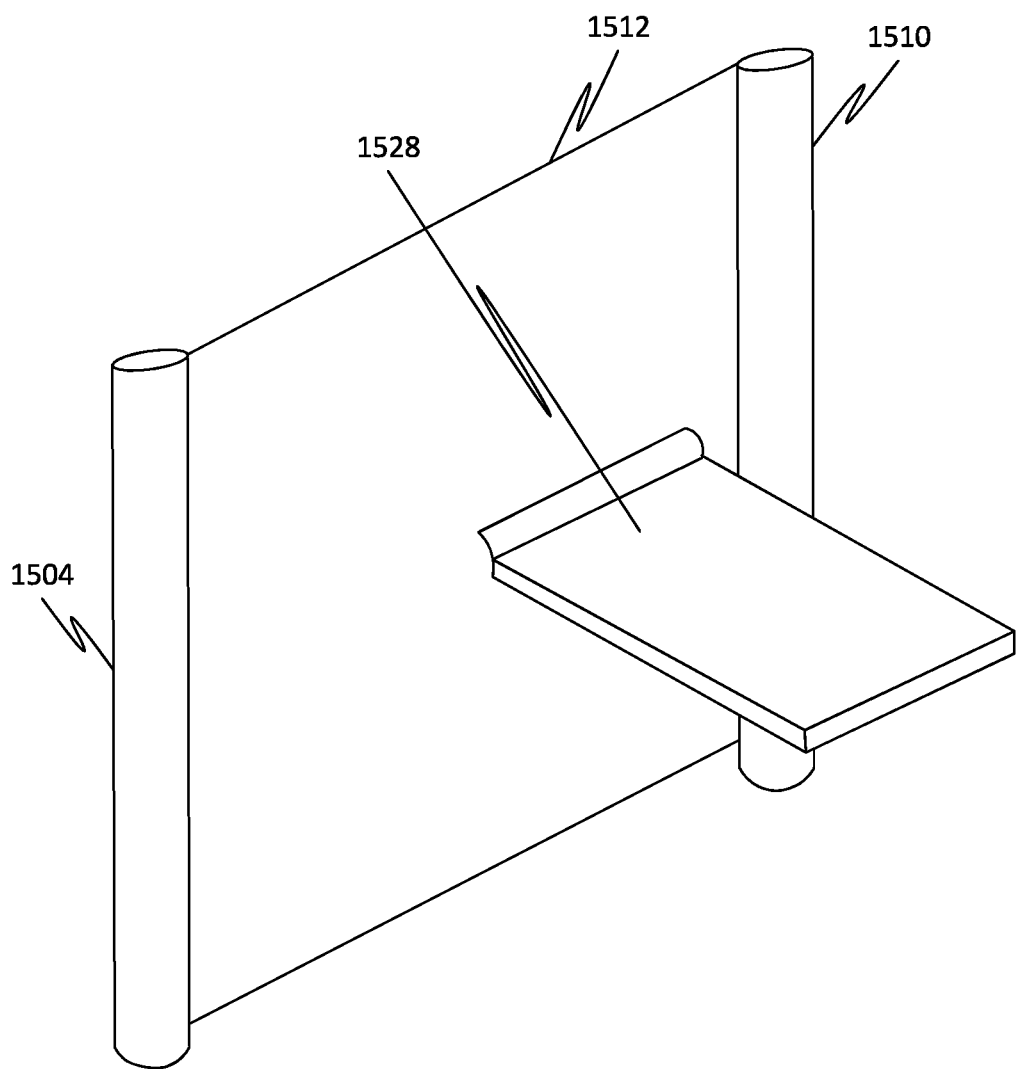
FIG. 25 is a top right side perspective view of the drop-down desk in the at least one desk open state, in accordance with some embodiments.

FIG. 25 is a top right side perspective view of the drop-down desk 1528 in the at least one desk open state, in accordance with some embodiments.

Figure 26:
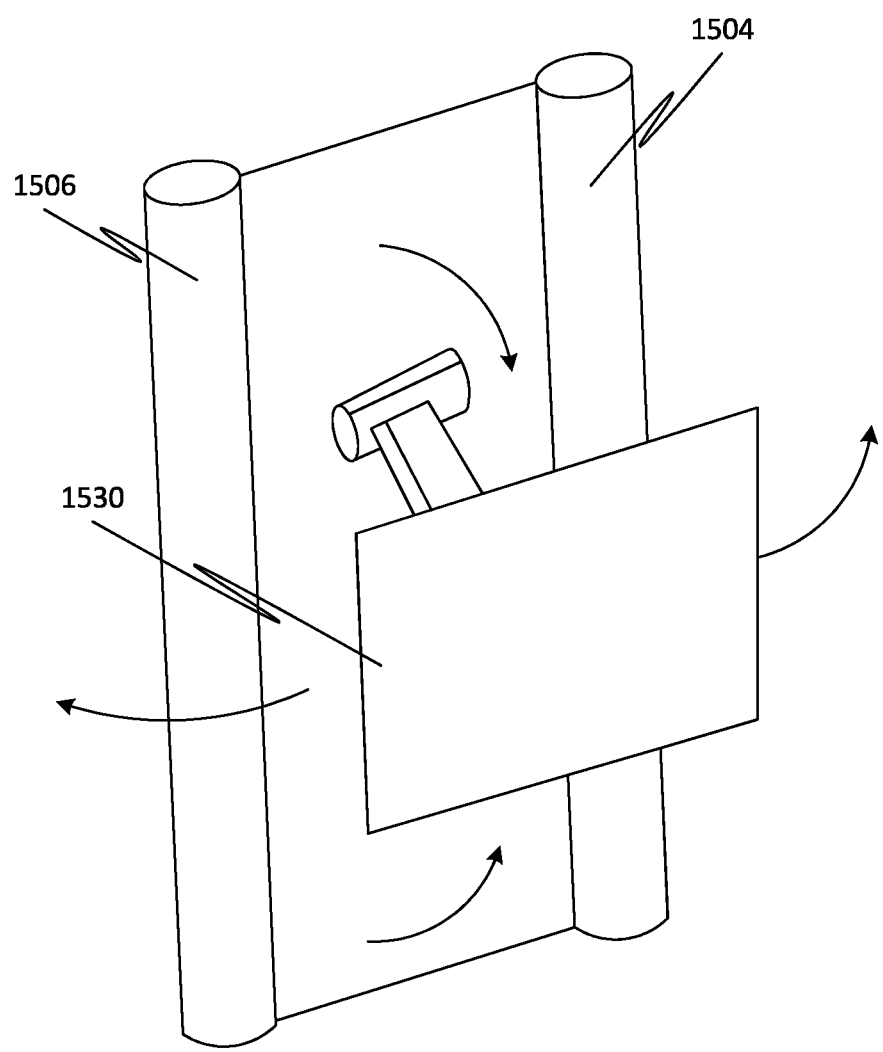
FIG. 26 is a top right side perspective view of the collapsible unit with at least one interface device, in accordance with some embodiments.

FIG. 26 is a top right side perspective view of the collapsible unit 1500 with at least one interface device 1530, in accordance with some embodiments.

Figure 27:
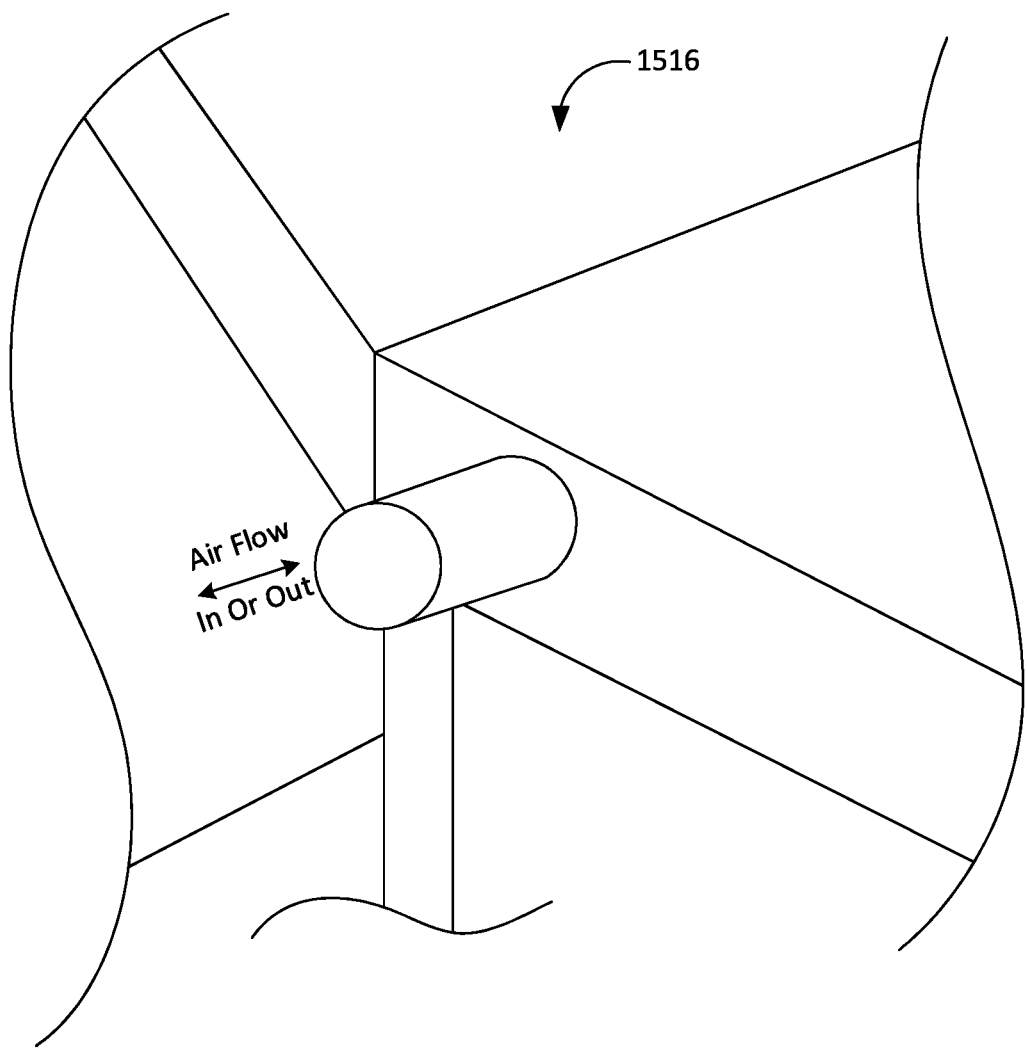
FIG. 27 is a partial top left side perspective view of the cushion, in accordance with some embodiments.

FIG. 27 is a partial top left side perspective view of the cushion 1602, in accordance with some embodiments.

FIG. 28 is a schematic of a communication network associated with the collapsible unit 1500, in accordance with some embodiments. Further, the communication network may include a plurality of sensors 2804-2810 disposed on the at least one surface 2802. Further, the plurality of sensors 2804-2810 may be communicatively coupled with the collapsible unit 1500. Further, the plurality of sensors 2804-2810 may be configured for generating at least one sensor data. Further, the collapsible unit 1500 may include at least one collapsible unit. Further, the at least one collapsible unit may be automatically deployable on at least one surface 2802 in at least one arrangement based on the at least one sensor data.

FIG. 29 is a top right side perspective view of the collapsible unit 100 for facilitating multiuse of the collapsible unit 100, in accordance with some embodiments.

FIG. 30 is a top right side perspective view of the collapsible unit 100 for facilitating multiuse of the collapsible unit 100, in accordance with some embodiments.

FIG. 31 is a top right side perspective view of the collapsible unit 100 for facilitating multiuse of the collapsible unit 100, in accordance with some embodiments.

Figure 32:
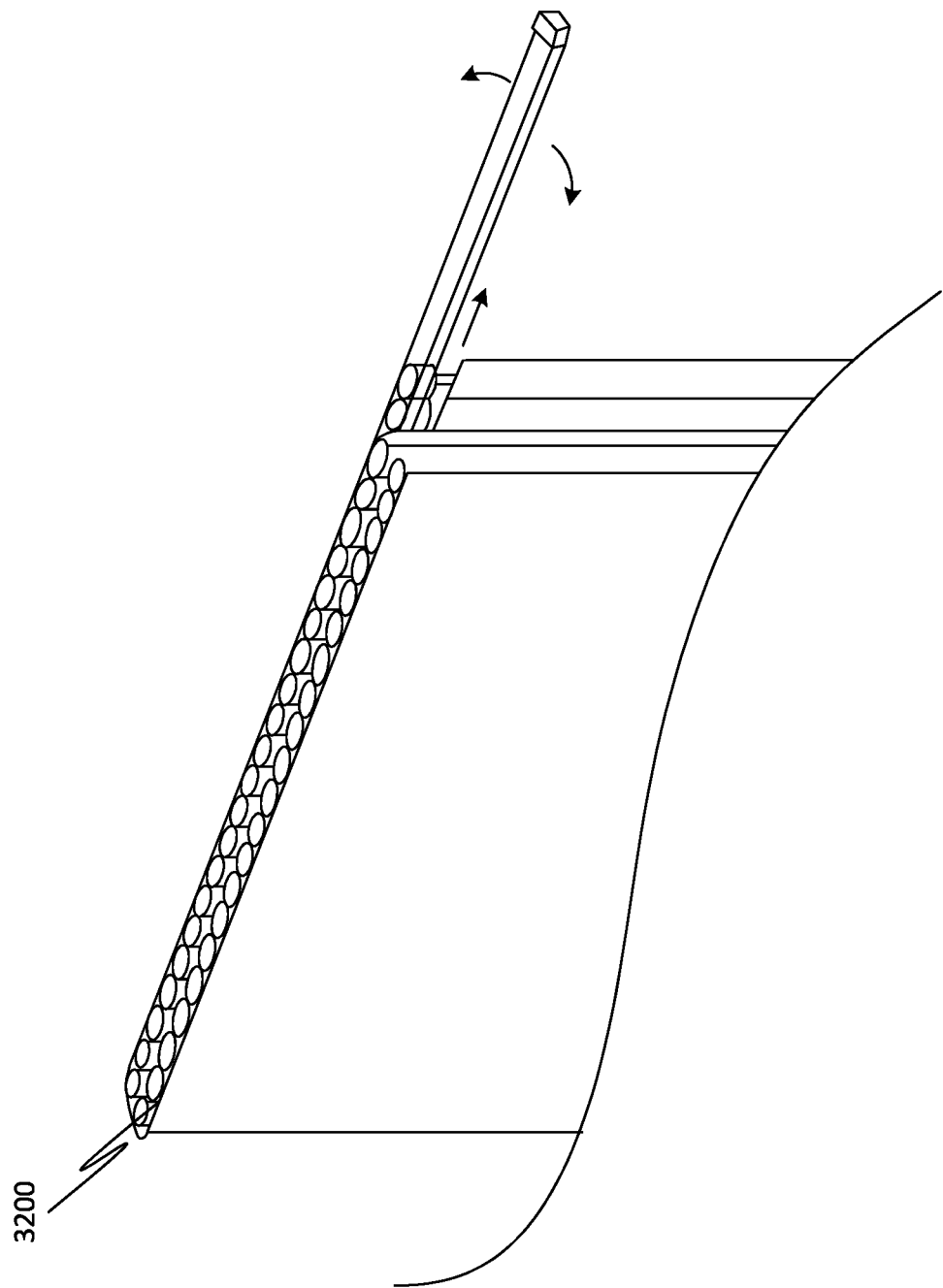
FIG. 32 is a partial top left side perspective view of a curtain roller of the collapsible unit, in accordance with some embodiments.

FIG. 32 is a partial top left side perspective view of a curtain roller 3200 of the collapsible unit 100, in accordance with some embodiments. Accordingly, the curtain roller 3200 may facilitate securing a privacy of a user. Further, the curtain roller 3200 may remain aligned in an aligned layer. Further, the curtain roller 3200 may allow the user to pass through the curtain roller 3200. Further, the curtain roller 3200 may afterward reset to the aligned layer. Further, a far end of a connector beam associated with the curtain roller 3200 may connect to a single cubicle (such as the collapsible unit 100) or to other cubicles. Further, the curtain roller 3200 may be retracted or extended based on user preference. Further, the curtain roller 3200 may be concealed.

Figure 33:
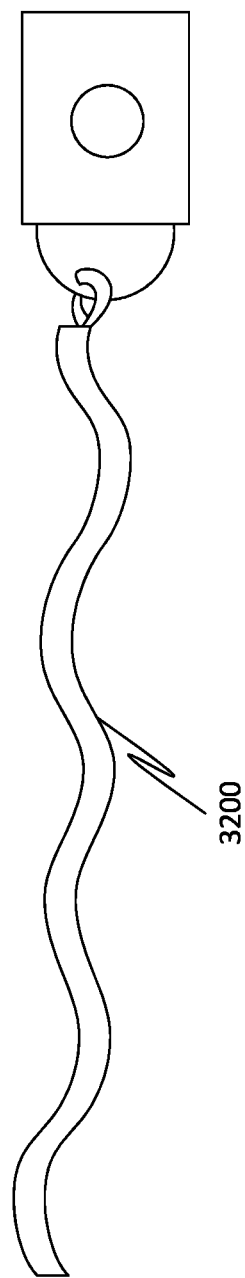
FIG. 33 is a top side view of the curtain roller, in accordance with some embodiments.

FIG. 33 is a top view of the curtain roller 3200, in accordance with some embodiments.

Figure 34:
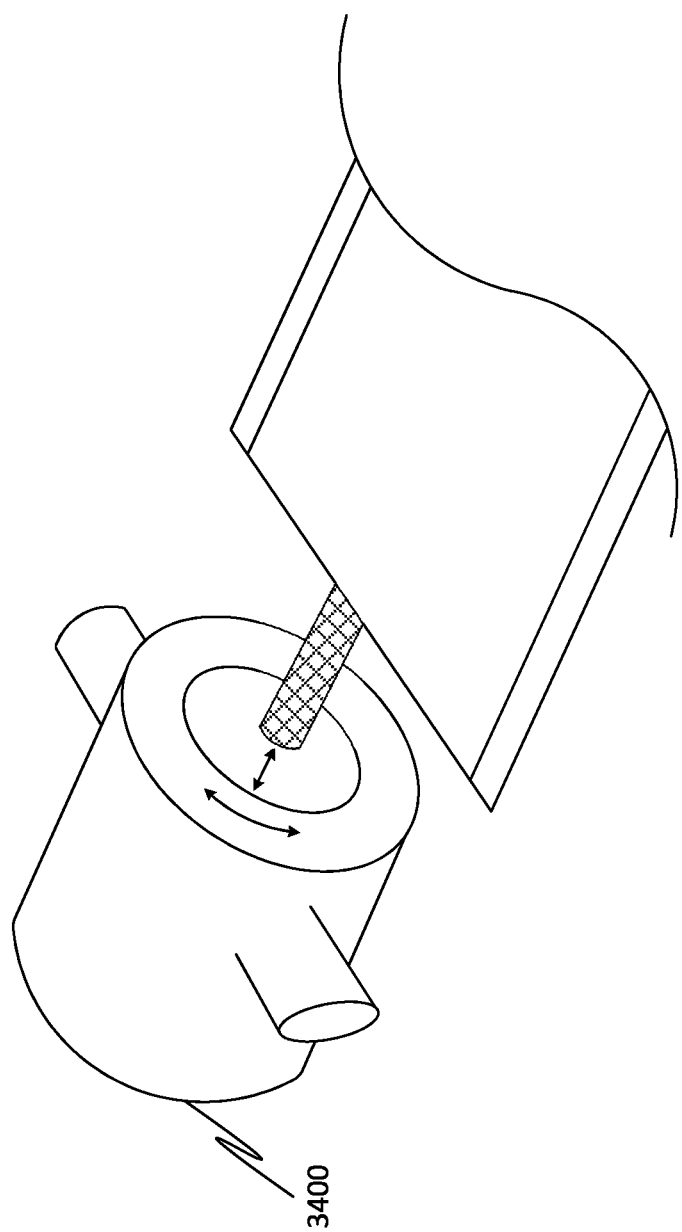
FIG. 34 is a partial top left side perspective view of at least one curtain coupling mechanism associated with the curtain roller, in accordance with some embodiments.

FIG. 34 is a partial top left side perspective view of at least one curtain coupling mechanism 3400 associated with the curtain roller 3200, in accordance with some embodiments. Accordingly, the curtain roller 3200 may be coupled with the frame 102 using the at least one curtain coupling mechanism 3400. Further, the curtain roller 3200 may include at least one curtain panel retractably extended between the first primary member and the second primary member for covering the at least one opening of the frame 102. Further, the covering of the at least one opening conceals the enclosure 114. Further, the at least one curtain coupling mechanism 3400 may include a magnetic strip. Further, the at least one curtain panel may be flexible.

Further, the at least one curtain panel may be transitionable between an open state and a closed state. Further, the at least one curtain panel allows access to the enclosure 114 through the at least one opening in the open state. Further, the at least one curtain panel restricts access to the enclosure 114 through the at least one opening in the closed state.

Figure 35:
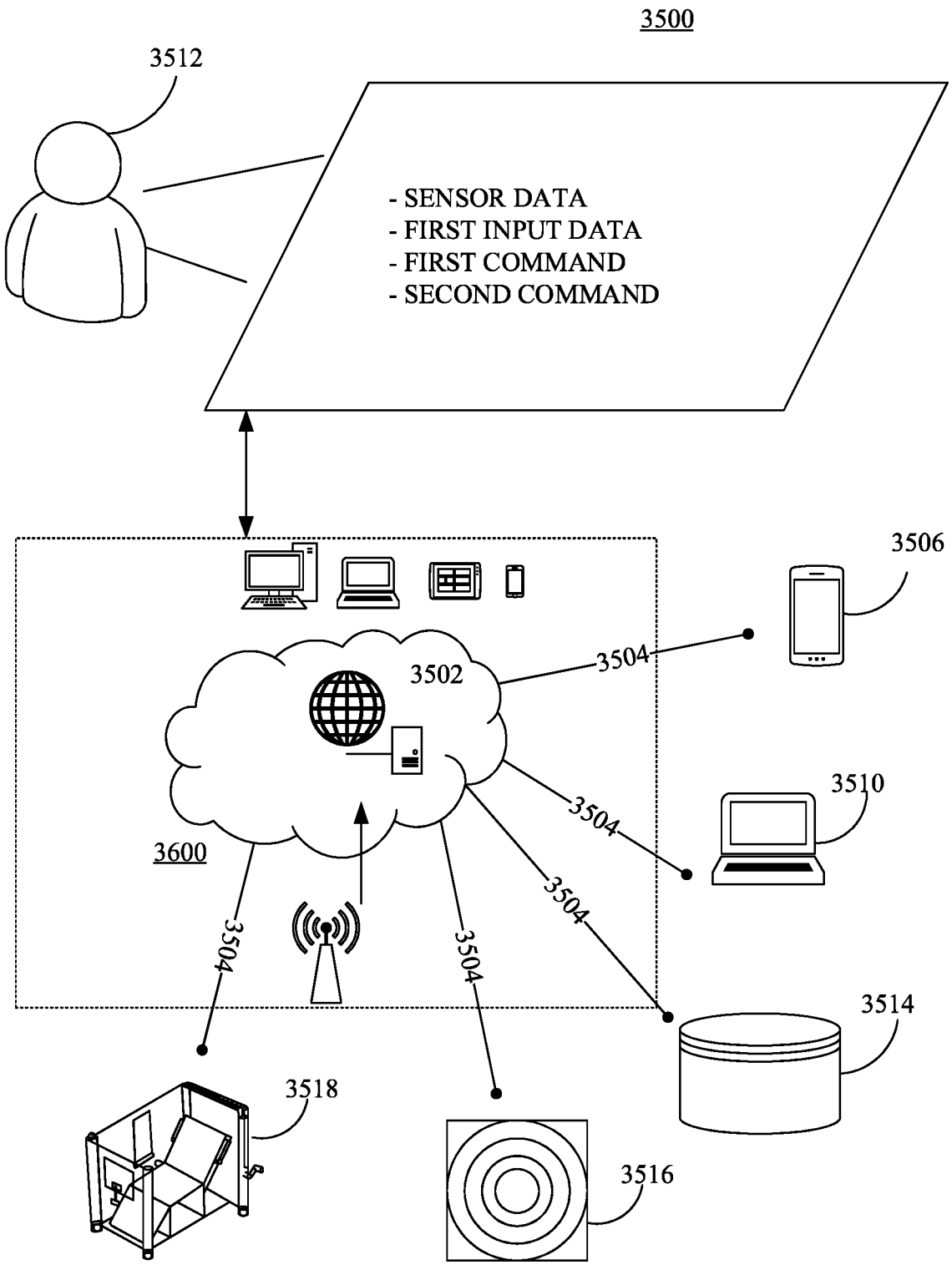
FIG. 35 is an illustration of an online platform consistent with various embodiments of the present disclosure.

FIG. 35 is an illustration of an online platform 3500 consistent with various embodiments of the present disclosure. By way of non-limiting example, the online platform 3500 to facilitate multiuse of the collapsible unit may be hosted on a centralized server 3502, such as, for example, a cloud computing service. The centralized server 3502 may communicate with other network entities, such as, for example, a mobile device 3506 (such as a smartphone, a laptop, a tablet computer, etc.), other electronic devices 3510 (such as desktop computers, server computers, etc.), databases 3514, sensors 3516, apparatus 3518 (such as the collapsible unit 100 and the collapsible unit 1500) over a communication network 3504, such as but not limited to, the Internet. Further, users of the online platform 3500 may include relevant parties such as, but not limited to, end-users, administrators, service providers, service consumers, and so on. Accordingly, in some instances, electronic devices operated by the one or more relevant parties may be in communication with the platform.

A user 3512, such as the one or more relevant parties, may access online platform 3500 through a web based software application or browser. The web based software application may be embodied as, for example, but not be limited to, a website, a web application, a desktop application, and a mobile application compatible with a computing device 3600.

Figure 36:
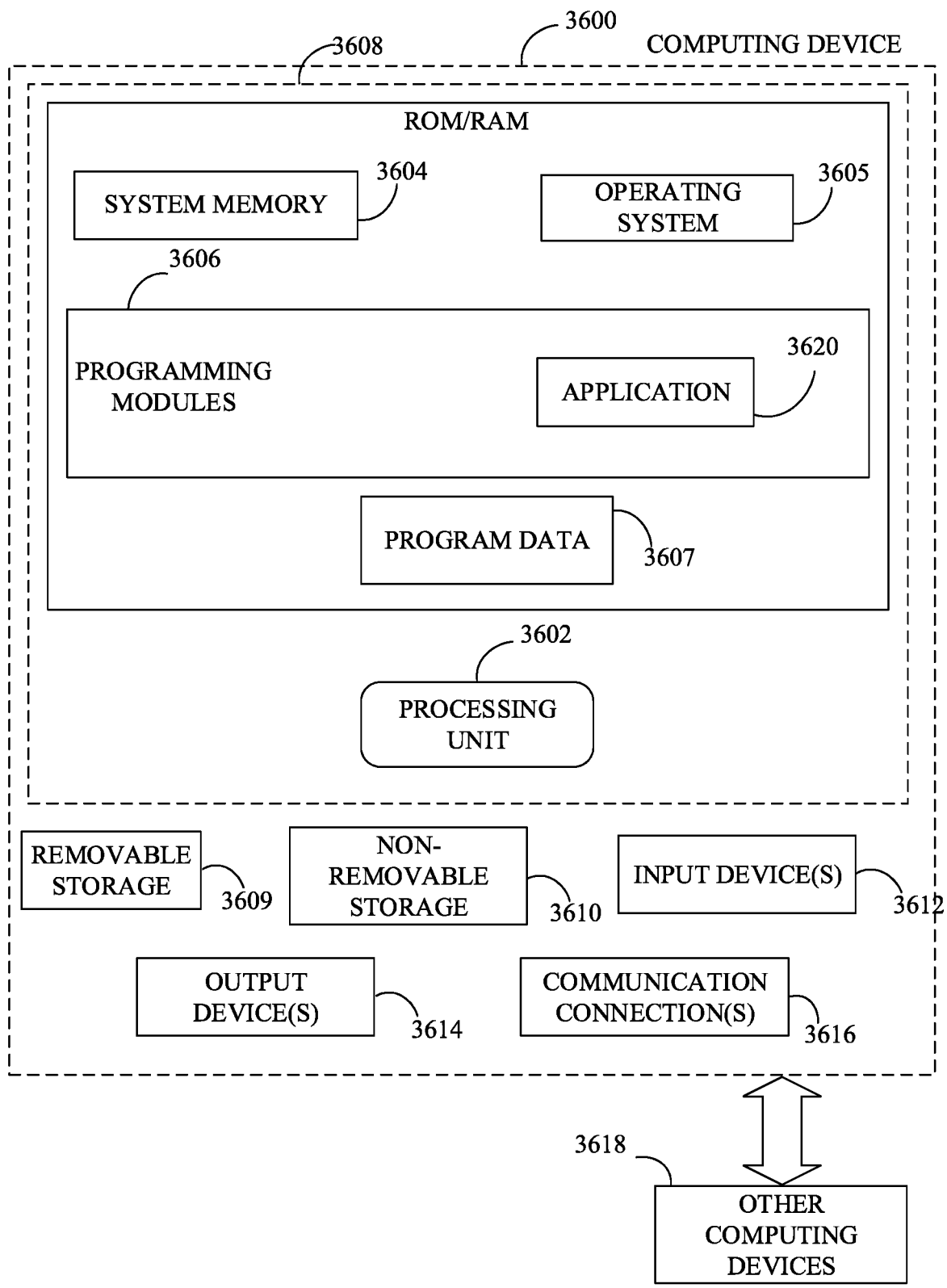
FIG. 36 is a block diagram of a computing device for implementing the methods disclosed herein, in accordance with some embodiments.

With reference to FIG. 36, a system consistent with an embodiment of the disclosure may include a computing device or cloud service, such as computing device 3600. In a basic configuration, computing device 3600 may include at least one processing unit 3602 and a system memory 3604. Depending on the configuration and type of computing device, system memory 3604 may comprise, but is not limited to, volatile (e.g. random-access memory (RAM)), non-volatile (e.g. read-only memory (ROM)), flash memory, or any combination. System memory 3604 may include operating system 3605, one or more programming modules 3606, and may include a program data 3607. Operating system 3605, for example, may be suitable for controlling computing device 3600's operation. In one embodiment, programming modules 3606 may include image-processing module, machine learning module. Furthermore, embodiments of the disclosure may be practiced in conjunction with a graphics library, other operating systems, or any other application program and is not limited to any particular application or system. This basic configuration is illustrated in FIG. 36 by those components within a dashed line 3608.

Computing device 3600 may have additional features or functionality. For example, computing device 3600 may also include additional data storage devices (removable and/or non-removable) such as, for example, magnetic disks, optical disks, or tape. Such additional storage is illustrated in FIG. 36 by a removable storage 3609 and a non-removable storage 3610. Computer storage media may include volatile and non-volatile, removable and non-removable media implemented in any method or technology for storage of information, such as computer-readable instructions, data structures, program modules, or other data. System memory 3604, removable storage 3609, and non-removable storage 3610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 3600. Any such computer storage media may be part of device 3600. Computing device 3600 may also have input device(s) 3612 such as a keyboard, a mouse, a pen, a sound input device, a touch input device, a location sensor, a camera, a biometric sensor, etc. Output device(s) 3614 such as a display, speakers, a printer, etc. may also be included. The aforementioned devices are examples and others may be used.

Computing device 3600 may also contain a communication connection 3616 that may allow device 3600 to communicate with other computing devices 3618, such as over a network in a distributed computing environment, for example, an intranet or the Internet. Communication connection 3616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 3604, including operating system 3605. While executing on processing unit 3602, programming modules 3606 (e.g., application 3620) may perform processes including, for example, one or more stages of methods, algorithms, systems, applications, servers, databases as described above. The aforementioned process is an example, and processing unit 3602 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The following is claimed:

1. A collapsible unit for facilitating multiuse of the collapsible unit, wherein the collapsible unit is deployable on at least one surface, wherein the collapsible unit comprises:
a frame comprising:
  a plurality of primary members disposed vertically in relation to the at least one surface;
  at least one secondary member coupled with the plurality of primary members, wherein a first end of a secondary member of the at least one secondary member is coupled to a first primary member of the plurality of primary members and a second end of the secondary member is coupled to a second primary member of the plurality of primary members, wherein the at least one secondary member is configured for retractably extending between a plurality of positions for movably positioning the plurality of primary members, wherein the movably positioning of the plurality of primary members transitions the frame between at least one extended state and a collapsed state, wherein the plurality of primary members and the at least one secondary member forms an enclosure and at least one opening leading into the enclosure in the at least one extended state, wherein the plurality of primary members do not form the enclosure in the collapsed state;
a seat member disposed in the frame, wherein the seat member is transitionable between at least one seat extended state and a seat collapsed state based on transitioning of the frame between the at least one extended state and the collapsed state, wherein the seat member comprises a seat panel disposed in the enclosure, wherein the seat panel is substantially perpendicular to the plurality of primary members in the at least one seat extended state, wherein the seat panel is substantially parallel to the plurality of primary members in the seat collapsed state;
a cushion coupled with the seat member, wherein the cushion comprises a top panel and a bottom panel, wherein a periphery of the top panel is attached to a periphery of the bottom panel for forming an interior space and an opening leading into the interior space, wherein the cushion is inflatably deflatable based on receivably removing of at least one fluid from the interior space through the opening; and
at least one wheel coupled to the frame, wherein the at least one wheel is configured for moving the collapsible unit on the at least one surface, wherein the movably positioning of the plurality of primary members is based on the moving of the at least one wheel.

2. The collapsible unit of claim 1 further comprising at least one curtain coupled with the frame using at least one curtain coupling mechanism, wherein the at least one curtain comprises at least one curtain panel retractably extended between the first primary member and the second primary member for covering the at least one opening of the frame, wherein the covering of the at least one opening conceals the enclosure.

3. The collapsible unit of claim 2, wherein the at least one curtain panel is transitionable between an open state and a closed state, wherein the at least one curtain panel allows access to the enclosure through the at least one opening in the open state, wherein the at least one curtain panel restricts access to the enclosure through the at least one opening in the closed state.

4. The collapsible unit of claim 1, wherein a wheel of the at least one wheel is configured for retractably extending from a base end of a primary member of the plurality of primary members, wherein the wheel is configured for transitioning between a wheel retracted state and a wheel extended state based on the retractably extending of the wheel, wherein the wheel protrudes from the base end in the wheel extended state, wherein the wheel does not protrude from the base end in the wheel retracted state, wherein the wheel moves the collapsible unit in the wheel extended state, wherein the wheel does not move the collapsible unit in the wheel retracted state.

5. The collapsible unit of claim 1 further comprising a drop-down desk coupled to the frame, wherein the drop-down desk comprises at least one desk panel, wherein a first end of the at least one desk panel is rotatably attached to the frame, wherein the drop-down desk is transitionable between a desk closed state and at least one desk open state, wherein the at least one desk panel is disposed in the enclosure, wherein the at least one desk panel is substantially perpendicular to at least one primary member of the plurality of primary members in the at least one desk open state, wherein the at least one desk panel is substantially parallel to the at least one primary member in the desk closed state.

6. The collapsible unit of claim 1 further comprising at least one interface device pivotally coupled to the frame using at least one coupling mechanism, wherein the at least one interface device is movable in a plurality of device positions, wherein the at least one interface device is orientable in at least one orientation.

7. The collapsible unit of claim 1 further comprising a handle crank assembly operationally coupled with the frame, wherein the handle crank assembly is configured for receiving at least one external force, wherein the handle crank assembly is configured for transitioning the frame between the at least one extended state and the collapsed state based on the receiving of the at least one external force.

8. The collapsible unit of claim 1, wherein the seat member comprises a backrest panel and a footrest panel, wherein the first primary member opposes the second primary member, wherein a first end of the footrest panel is pivotally coupled to a base end of the first primary member and a second end of the footrest panel is pivotally coupled to a first end of the seat panel and a second end of the seat panel is pivotally coupled with a first end of the backrest panel and a second end of the backrest panel is pivotally coupled with a top end of the second primary member, wherein the footrest panel and the backrest panel is substantially perpendicular to the seat panel in the at least one seat extended state, wherein the footrest panel and the backrest panel is substantially parallel to the seat panel in the seat collapsed state.

9. The collapsible unit of claim 1 further comprising:
at least one first actuator operationally coupled with the frame, wherein the at least one first actuator is configured for transitioning the frame between the at least one extended state and the collapsed state based on an input command; and
at least one input device communicatively coupled with the at least one first actuator, wherein the at least one input device is configured for generating the input command based on at least one action receivable by the at least one input device.

10. The collapsible unit of claim 1 further comprising:
a plurality of sensors disposed on the at least one surface, wherein each sensor of the plurality of sensors is configured for generating sensor data based on a position of at least one object in relation to the each sensor;
a processing device communicatively coupled with the plurality of sensors, wherein the processing device is configured for:
analyzing the sensor data;
determining a location on the at least one surface based on the analyzing; and
generating a second command based on the determining; and
at least one third actuator operationally coupled with the at least one wheel, wherein the at least one third actuator is communicatively coupled with the processing device, wherein the at least one third actuator is configured for moving the at least one wheel based on the second command for positioning the collapsible unit in the location on the at least one surface.

11. A collapsible unit for facilitating multiuse of the collapsible unit, wherein the collapsible unit is deployable on at least one surface, wherein the collapsible unit comprises:
a frame comprising:
a plurality of primary members disposed vertically in relation to the at least one surface;
at least one secondary member coupled with the plurality of primary members, wherein a first end of a secondary member of the at least one secondary member is coupled to a first primary member of the plurality of primary members and a second end of the secondary member is coupled to a second primary member of the plurality of primary members, wherein the plurality of primary members are movably positionable to a plurality of positions for transitioning the at least one secondary member between at least one member extended state and a folded state, wherein the transitioning of the at least one secondary member transitions the frame between at least one extended state and a collapsed state, wherein the plurality of primary members and the at least one secondary member forms an enclosure and at least one opening leading into the enclosure in the at least one extended state, wherein the plurality of primary members do not form the enclosure in the collapsed state;
a seat member disposed in the frame, wherein the seat member is transitionable between at least one seat extended state and a seat collapsed state based on transitioning of the frame between the at least one extended state and the collapsed state, wherein the seat member comprises a seat panel disposed in the enclosure, wherein the seat panel is substantially perpendicular to the plurality of primary members in the at least one seat extended state, wherein the seat panel is substantially parallel to the plurality of primary members in the seat collapsed state;
at least one curtain coupled with the frame using at least one curtain coupling mechanism, wherein the at least one curtain comprises at least one curtain panel retractably extended between the first primary member and the second primary member covering the at least one opening of the frame, wherein the covering of the at least one opening conceals the enclosure; and
at least one wheel coupled to the frame, wherein the at least one wheel is configured for moving the collapsible unit on the at least one surface, wherein the at least one wheel is configured for positioning the plurality of primary members to the plurality of positions based on the moving of the at least one wheel.

12. The collapsible unit of claim 11 further comprising a cushion coupled with the seat member, wherein the cushion comprises a top panel and a bottom panel, wherein a periphery of the top panel is attached to a periphery of the bottom panel for forming an interior space and an opening leading into the interior space, wherein the cushion is inflatably deflatable based on receivably removing of at least one fluid from the interior space through the opening.

13. The collapsible unit of claim 11, wherein a wheel of the at least one wheel is configured for retractably extending from a base end of a primary member of the plurality of primary members, wherein the wheel is configured for transitioning between a wheel retracted state and a wheel extended state based on the retractably extending of the wheel, wherein the wheel protrudes from the base end in the wheel extended state, wherein the wheel does not protrude from the base end in the wheel retracted state, wherein the wheel moves the collapsible unit in the wheel extended state, wherein the wheel does not move the collapsible unit in the wheel retracted state.

14. The collapsible unit of claim 11 further comprising a drop-down desk coupled to the frame, wherein the drop-down desk comprises at least one desk panel, wherein a first end of the at least one desk panel is rotatably attached to the frame, wherein the drop-down desk is transitionable between a desk closed state and at least one desk open state, wherein the at least one desk panel is disposed in the enclosure, wherein the at least one desk panel is substantially perpendicular to at least one primary member of the plurality of primary members in the at least one desk open state, wherein the at least one desk panel is substantially parallel to the at least one primary member in the desk closed state.

15. The collapsible unit of claim 11 further comprising a handle crank assembly operationally coupled with the frame, wherein the handle crank assembly is configured for receiving at least one external force, wherein the handle crank assembly is configured for transitioning the frame between the at least one extended state and the collapsed state based on the receiving of the at least one external force.

16. The collapsible unit of claim 11, wherein the seat member comprises a backrest panel and a footrest panel, wherein the first primary member opposes the second primary member, wherein a first end of the footrest panel is pivotally coupled to a base end of the first primary member and a second end of the footrest panel is pivotally coupled to a first end of the seat panel and a second end of the seat panel is pivotally coupled with a first end of the backrest panel and a second end of the backrest panel is pivotally coupled with a top end of the second primary member, wherein the footrest panel and the backrest panel is substantially perpendicular to the seat panel in the at least one seat extended state, wherein the footrest panel and the backrest panel is substantially parallel to the seat panel in the seat collapsed state.

17. A collapsible unit for facilitating multiuse of the collapsible unit, wherein the collapsible unit is deployable on at least one surface, wherein the collapsible unit comprises:
- a frame comprising:
  - a plurality of primary members disposed vertically in relation to the at least one surface;
  - at least one secondary member coupled with the plurality of primary members, wherein a first end of a secondary member of the at least one secondary member is coupled to a first primary member of the plurality of primary members and a second end of the secondary member is coupled to a second primary member of the plurality of primary members, wherein the at least one secondary member is configured for retractably extending between a plurality of positions for movably positioning the plurality of primary members, wherein the movably positioning of the plurality of primary members transitions the frame between at least one extended state and a collapsed state, wherein the plurality of primary members and the at least one secondary member forms an enclosure and at least one opening leading into the enclosure in the at least one extended state, wherein the plurality of primary members do not form the enclosure in the collapsed state;
- a seat member disposed in the frame, wherein the seat member is transitionable between at least one seat extended state and a seat collapsed state based on transitioning of the frame between the at least one extended state and the collapsed state, wherein the seat member comprises a seat panel disposed in the enclosure, wherein the seat panel is substantially perpendicular to the plurality of primary members in the at least one seat extended state, wherein the seat panel is substantially parallel to the plurality of primary members in the seat collapsed state;
- at least one wheel coupled to the frame, wherein the at least one wheel is configured for moving the collapsible unit on the at least one surface, wherein the movably positioning of the plurality of primary members is based on the moving of the at least one wheel; and
- a communication device disposed on the frame, wherein the communication device is configured for receiving at least one first input data from at least one user device;
- a processing device disposed on the frame, wherein the processing device is communicatively coupled with the communication device, wherein the processing device is configured for:
  - analyzing the at least one first input data;
  - determining a location on the at least one surface based on the analyzing; and
  - generating a first command based on the determining; and
- at least one second actuator operationally coupled with the at least one wheel, wherein the at least one second actuator is communicatively coupled with the processing device, wherein the at least one second actuator is configured for moving the at least one wheel based on the first command for positioning the collapsible unit in the location on the at least one surface.

* * * * *